(12) United States Patent
Huang et al.

(10) Patent No.: US 12,169,595 B2
(45) Date of Patent: Dec. 17, 2024

(54) METHODS, DEVICES, AND COMPUTER-READABLE STORAGE MEDIA FOR PERFORMING A FUNCTION BASED ON USER INPUT

(71) Applicant: HUAWEI TECHNOLOGIES CO., LTD., Guangdong (CN)

(72) Inventors: Da-Yuan Huang, Markham (CA); Wenshu Luo, Toronto (CA); Che Yan, Toronto (CA); Wei Li, Richmond Hill (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/331,562

(22) Filed: May 26, 2021

(65) Prior Publication Data

US 2022/0382374 A1  Dec. 1, 2022

(51) Int. Cl.
*G06F 3/01* (2006.01)
*G06F 3/04842* (2022.01)
(Continued)

(52) U.S. Cl.
CPC .......... *G06F 3/016* (2013.01); *G06F 3/04842* (2013.01); *G06F 3/04883* (2013.01); *G06F 3/04886* (2013.01)

(58) Field of Classification Search
CPC .. G06F 3/016; G06F 3/04842; G06F 3/04883; G06F 3/04886
See application file for complete search history.

(56) References Cited

U.S. PATENT DOCUMENTS 8,751,970 B2 * 6/2014 Hinckley .............. G06F 3/0416
  345/173
10,929,016 B1 * 2/2021 Liu ........................ G06F 1/1664
(Continued)

FOREIGN PATENT DOCUMENTS

| CN | 106201320 A | 12/2016 |
| CN | 109428969 A | 3/2019 |
| CN | 110535985 A | 12/2019 |

OTHER PUBLICATIONS

Jiseong Gu, Seongkook Heo, Jaehyun Han, Sunjun Kim, and Geehyuk Lee. 2013. LongPad: a touchpad using the entire area below the keyboard of a laptop computer. Proceedings of the SIGCHI Conference on Human Factors in Computing Systems. Association for Computing Machinery, New York, NY, USA, 1421-1430. DOI:https://doi.org/10.1145/2470654.2466188.

(Continued)

*Primary Examiner* — Tadesse Hailu
(74) *Attorney, Agent, or Firm* — Locke Lord LLP; Tim Tingkang Xia, Esq.

(57) ABSTRACT

There is described a method performed by a computing device having first and second touch-sensitive user interfaces. According to this method, when a user input is applied to one of the first and second user interfaces, the computing device detects the user input and determines a force applied by the user input and a type of the user input. The computing device then determines whether to perform a function such as whether to display a virtual trackpad or a virtual keyboard, based on the force, the type of the user input, and a determination whether the user input is applied to a selected one of the first and second user interfaces.

18 Claims, 13 Drawing Sheets

(51) Int. Cl.
  *G06F 3/04883* (2022.01)
  *G06F 3/04886* (2022.01)

(56) References Cited

U.S. PATENT DOCUMENTS

| | | | | |
|---|---|---|---|---|
| 10,989,978 | B1* | 4/2021 | Tsen | G01R 33/072 |
| 10,990,204 | B1* | 4/2021 | Trim | G06F 3/0202 |
| 11,079,995 | B1* | 8/2021 | Hulbert | G06F 3/0485 |
| 11,144,161 | B1* | 10/2021 | Pundak | G06F 3/0418 |
| 11,543,938 | B2* | 1/2023 | Clarke | G06F 3/04883 |
| 11,550,471 | B2* | 1/2023 | Alonso Ruiz | G06F 3/04886 |
| 2005/0162402 | A1* | 7/2005 | Watanachote | G06F 3/0416 345/173 |
| 2006/0132455 | A1* | 6/2006 | Rimas-Ribikauskas | G06F 3/0414 345/173 |
| 2009/0009482 | A1* | 1/2009 | McDermid | G06F 1/169 345/173 |
| 2010/0007613 | A1* | 1/2010 | Costa | G06F 1/1616 345/173 |
| 2011/0050576 | A1* | 3/2011 | Forutanpour | G06F 3/04886 345/173 |
| 2011/0209104 | A1* | 8/2011 | Hinckley | G06F 3/04883 715/863 |
| 2011/0215914 | A1* | 9/2011 | Edwards | G06F 3/041 340/407.2 |
| 2011/0216015 | A1* | 9/2011 | Edwards | G06F 3/041 345/173 |
| 2012/0019448 | A1* | 1/2012 | Pitkanen | G06F 3/04886 345/173 |
| 2012/0133484 | A1* | 5/2012 | Griffin | G06F 3/04883 340/5.54 |
| 2013/0100045 | A1* | 4/2013 | Honji | G06F 3/0416 345/173 |
| 2013/0113717 | A1* | 5/2013 | Van Eerd | G06F 3/016 345/173 |
| 2013/0113720 | A1* | 5/2013 | Van Eerd | G06F 3/016 345/173 |
| 2013/0181931 | A1 | 7/2013 | Kinoshita | |
| 2014/0354587 | A1* | 12/2014 | Mohindra | G06F 3/016 345/174 |
| 2015/0109237 | A1* | 4/2015 | Liang | G06F 3/04886 345/174 |
| 2015/0143273 | A1* | 5/2015 | Bernstein | G06F 3/0483 715/767 |
| 2015/0213244 | A1* | 7/2015 | Lymberopoulos | G06V 40/70 726/19 |
| 2017/0083096 | A1* | 3/2017 | Rihn | G06F 3/03545 |
| 2017/0235483 | A1* | 8/2017 | Alonso Ruiz | G06F 3/04883 715/773 |
| 2017/0285933 | A1* | 10/2017 | Oh | G06F 3/04847 |
| 2018/0074694 | A1* | 3/2018 | Lehmann | G06F 3/0447 |
| 2018/0217668 | A1* | 8/2018 | Ligtenberg | G06F 3/016 |
| 2018/0218859 | A1* | 8/2018 | Ligtenberg | G06F 3/0488 |
| 2019/0272091 | A1* | 9/2019 | Seo | G06F 1/1643 |
| 2020/0034017 | A1* | 1/2020 | Lin | G06F 3/03547 |
| 2020/0042167 | A1* | 2/2020 | Bang | G06F 3/038 |
| 2020/0089367 | A1* | 3/2020 | Zarraga | G06F 3/04883 |
| 2020/0278747 | A1* | 9/2020 | Ligtenberg | H01H 13/85 |
| 2020/0387245 | A1* | 12/2020 | Chen | G06F 3/0202 |
| 2021/0089161 | A1* | 3/2021 | Steinmark | G06F 3/03547 |
| 2021/0096741 | A1* | 4/2021 | Klein | G06F 3/03547 |
| 2021/0303147 | A1* | 9/2021 | Guerrero | G06F 3/04886 |
| 2021/0405870 | A1* | 12/2021 | Marsden | G06F 3/016 |

OTHER PUBLICATIONS

Teng Han, Jiannan Li, Khalad Hasan, Keisuke Nakamura, Randy Gomez, Ravin Balakrishnan, and Pourang Irani. 2018. PageFlip: Leveraging Page-Flipping Gestures for Efficient Command and Value Selection on Smartwatches. Proceedings of the 2018 CHI Conference on Human Factors in Computing Systems. Association for Computing Machinery, New York, NY, USA, Paper 529, 1-12. DOI:https://doi.org/10.1145/3173574.3174103.

* cited by examiner

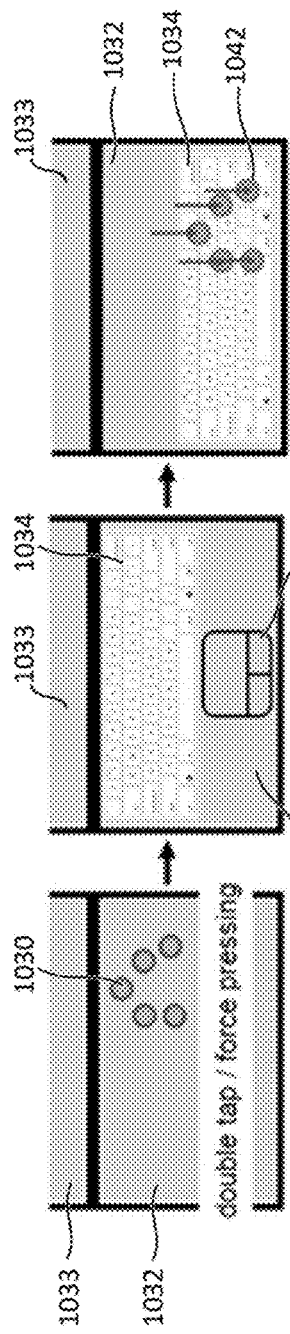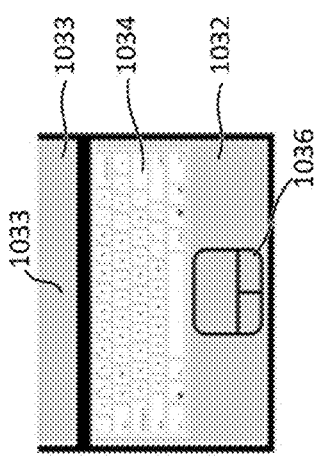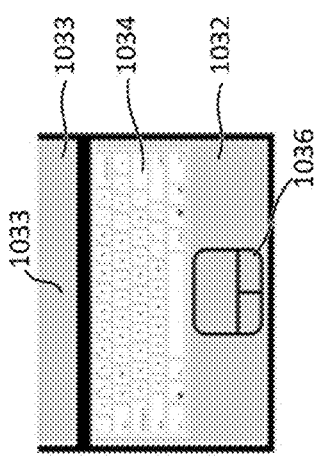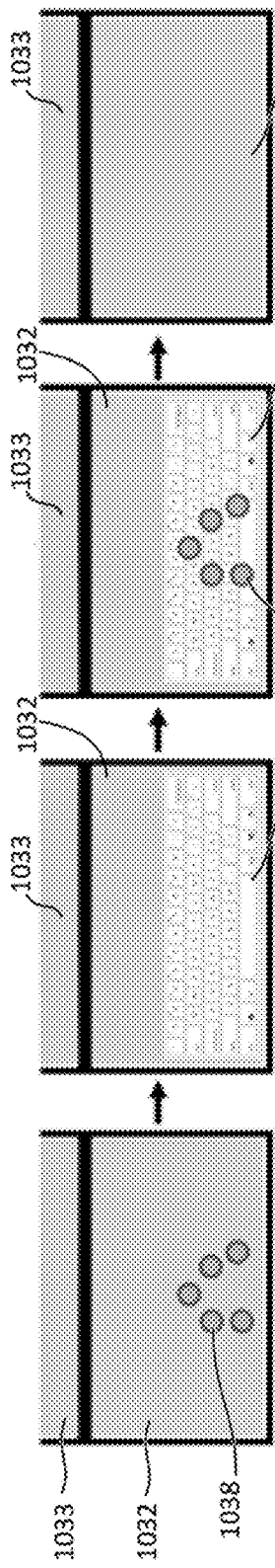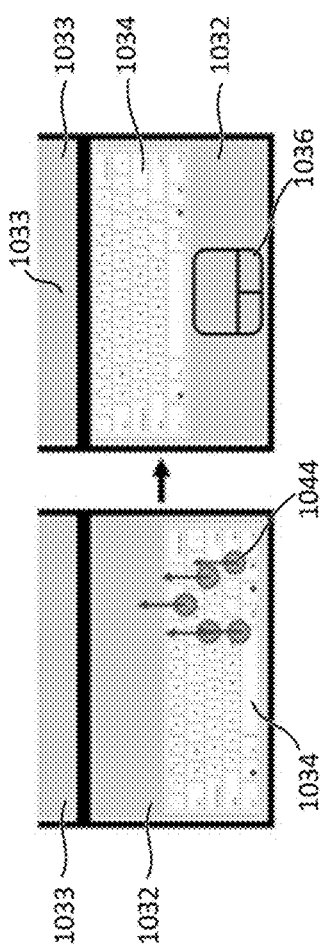

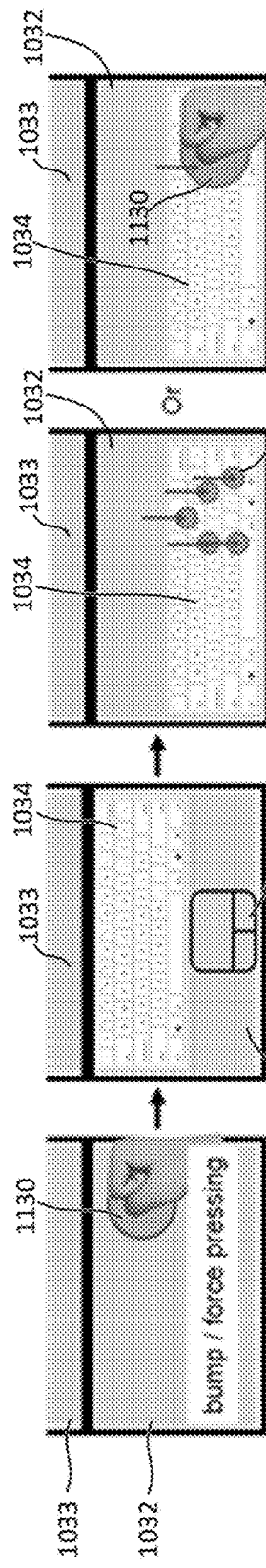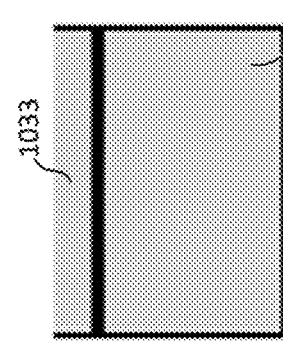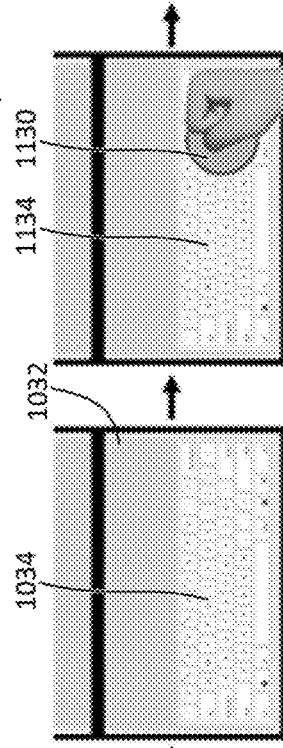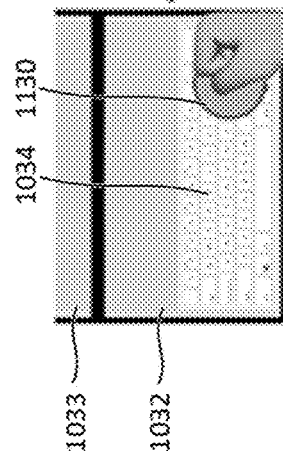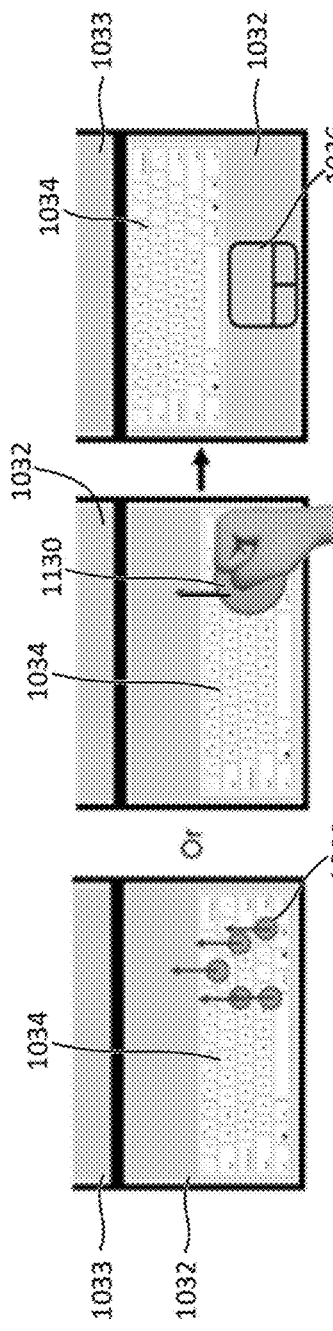

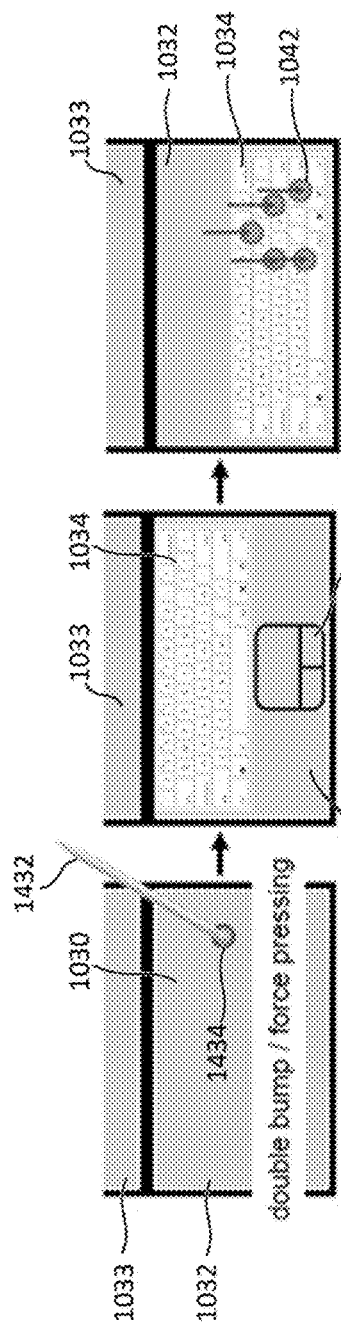
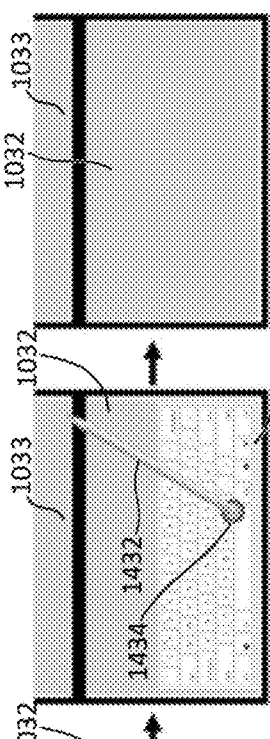
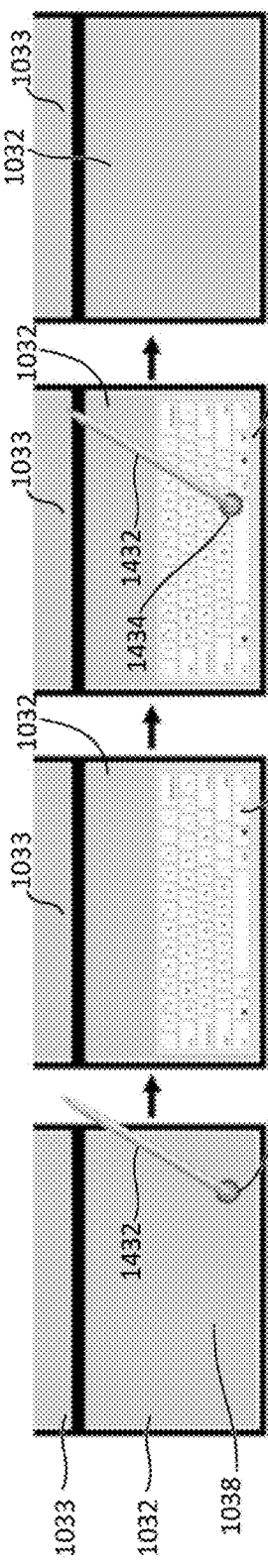
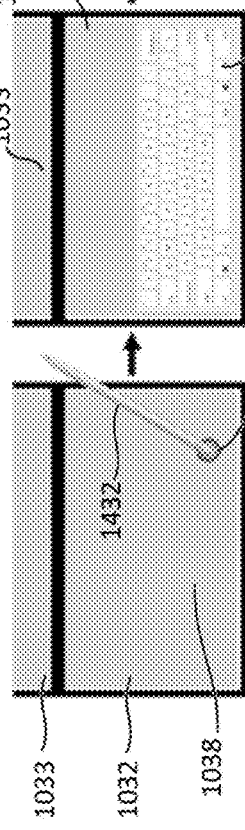
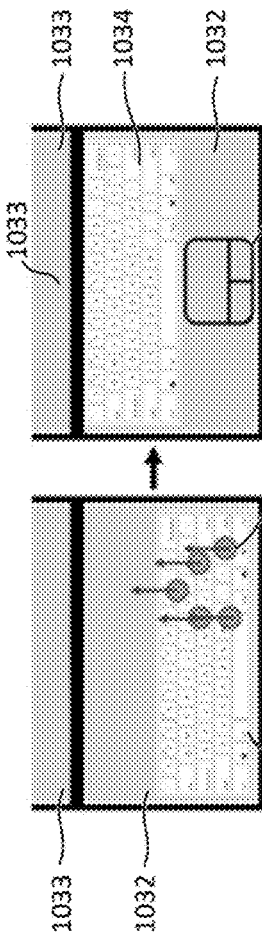

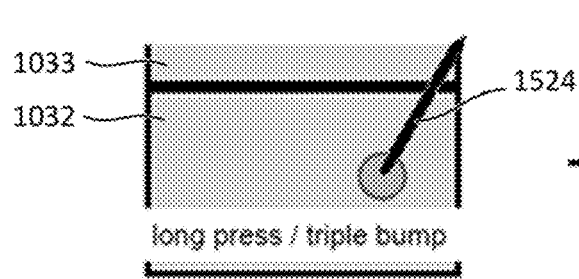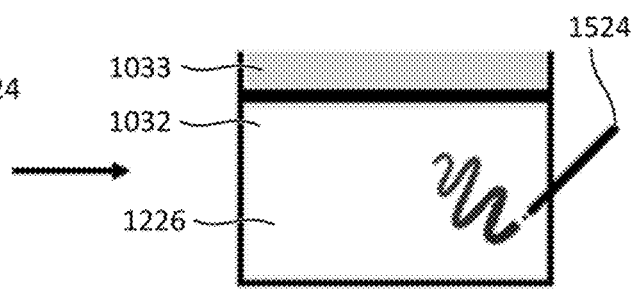
FIG. 15A  FIG. 15B

METHODS, DEVICES, AND COMPUTER-READABLE STORAGE MEDIA FOR PERFORMING A FUNCTION BASED ON USER INPUT

FIELD

The present disclosure relates to a method, device, and computer-readable storage medium for causing a computing device to perform a function, such as switching between different modes, based on a user input provided to the computing device.

BACKGROUND

Dual-screen laptops are becoming increasingly popular, and the devices typically employ a pair of touch-sensitive screens that may replace a physical keyboard and trackpad. A user may therefore type, use the mouse, and perform other functions on the device by interacting solely with the device's screens.

By using a second touch-sensitive display, dual-screen laptops may additionally change modes in order to meet the specific needs of the user. For example, when a user is using word processing software such as Microsoft® Word (MICROSOFT is a trademark or registered trademark of the Microsoft Corp., Redmond, WA, USA), the user may type using a virtual keyboard on one of the screens. If the user wishes to switch to a drawing application such Adobe Illustrator® (ILLUSTRATOR is a trademark or registered trademark of Adobe Inc. of San Jose, California, USA), the user may, for example, instruct the device to replace the virtual keyboard with a virtual drawing board by actuating specific keys on a specific area of the device.

However, the operation of switching between these two input modes using existing techniques can be slow, and as a result may cause significant disruption to the user's workflow.

SUMMARY

Generally, according to embodiments of the disclosure, there are described methods of enabling a computing device to switch between modes (such as different display modes, as described in further detail below) based on a user input applied to the computing device. According to certain embodiments, the computing device includes multiple user interfaces (such as touch-sensitive screens or touch-sensitive surfaces), and for example may be a dual-screen laptop. A user input is applied to a user interface of the computing device. For example, any one of a number of different gesture types is provided to the user interface, such as a touch-sensitive surface, of the computing device. A gesture type may, for example, be associated with a particular geometric pattern or shape defining a contact area on the touch-sensitive surface at which the user input is applied. For instance, a user may interact with the user interface, by using any one of the number of different gesture types. One or more sensors of the computing device may determine a force with which the user input is applied to the user interface. In addition, a processor of the computing device may determine the type of user input that is applied to (e.g. physically received at) the user interface. For example, the one or more sensors may detect a geometric pattern or shape that is defined on the user interface as a result of the user interacting with the user interface. The one or more sensors may then communicate data relating to the detected geometric pattern or shape to a processor of the computing device, whereupon the computing device may then compare the geometric pattern or shape to a one or more stored gesture types (which may be stored, for example, in one or more storage media). Examples of stored gesture types include, but are not limited to, alone or in combination, any of one or more particular finger chords (e.g. relative positions of tips of a user's fingers in contact with the user interface), any of one or more finger swipes, one or more fist bumps, and whether an end of a stylus, such as an eraser end of a stylus, or a body or a stylus, is determined to have contacted the user interface. The processor may therefore determine a specific type of the user input that is applied to the user interface.

Based on the determined force with which the user input is applied to the user interface, and based on the determined type of the user input, the processor may determine whether to transition the computing device from a first mode to a second mode. For example, if the force with which the user input is applied to the user interface is calculated as being above a preset force threshold, and if the type of the user input is determined to correspond to one or more preset gesture types, then the processor may cause the user interface to transition from a first mode in which the user interface displays a virtual keyboard, for example, to a second mode in which the user interface displays a virtual trackpad, for example.

Accordingly, embodiments of the disclosure include combining both a determination of a force with which the user input is applied to the user interface, and a determination of the type of the user input, in order to determine whether or not the computing device is to perform a preset function, such as switching between different modes, and for instance such as causing a display of the computing device to switch between displaying a virtual keyboard and a virtual trackpad, or vice versa.

Embodiments of the disclosure may be suited to dual-screen laptops or similar computing devices, and may be applied to other computing devices that do not necessarily use two or more screens but more generally have two or more touch-sensitive surfaces. Dual-screen computing devices advantageously enable users to perform different tasks with relative ease. Such devices therefore bring convenience to users and can also increase their work efficiency. For example, when a user is using a 3D-modeling design tool, they often need to control the mouse and use the keyboard at the same time. However, switching between these two modes with existing techniques can be slow, and this may cause significant disruption to the user's workflow. Therefore, by providing an improved method of enabling mode switching, as described herein, mode switching may be simplified and the user's workflow may be improved. Furthermore, by using force sensing in combination with the detection of one or more gesture types as a trigger for the mode switching, mode-switching triggers may be detected more accurately.

According to one aspect of this disclosure, there is provided a method performed by a computing device having a first touch-sensitive user interface and a second touch-sensitive user interface. The method comprises: detecting a user input applied to one of the first and second user interfaces; determining a force of the user input; determining a type of the user input; and performing a function such as a mode switching by the computing device based on the force, the type of the user input, and a detection of the user input applied to a selected one of the first and second user interfaces.

Thus, triggering of the mode switching is based on a force associated with the user input (and measurable by one or more sensors of the computing device), a specific type of the user input (for example, a particular geometric pattern or shape defining the contact area of the user input), and a selected one of the first and second user interfaces. By using such a combination to trigger mode switching, more efficient mode switching may be performed by the computing device, with fewer accidental mode switches.

Advantageously, the user experience may be improved, especially for dual-screen computing devices such as dual-screen laptops and/or dual-screen smartphone, wherein one screen (denoted the lower screen) may be predefined or oriented such that it is suitable to be used as an input means such as a virtual keyboard and/or a virtual trackpad to allow a user to provide inputs (such as typing, computer cursor manipulation, and/or the like), while the other screen (denoted the upper screen) is suitable to be used as a display means (with touch-sensing functionalities). More specifically, a user may use above-described method to "switch-on" a virtual keyboard and/or a virtual trackpad on the lower screen such that the user may apply inputs to the computing device in a conventional manner. The user may also "switch-off" the virtual keyboard and/or the virtual trackpad from the lower screen such that a portion or the entirety of the lower screen may be used for displaying information (with touch-sensing functionalities).

In some embodiments, the function performed by the computing device comprises modifying at least a portion of one or both of the first and second user interfaces.

For example, a portion of one or both of the first and second user interfaces may be adjusted such that the portion of the one or both of the first and second user interfaces may be adjusted to display a new object, a different object to one previously being displayed, or more generally new or different information to the user.

In some embodiments, the function performed by the computing device comprises modifying at least a portion of the selected user interface to which the user input is applied. For example, the lower screen may be controlled to display the virtual keyboard where the user may apply input thereto. The portion of the lower screen that displays the virtual keyboard may be modified to switch from the virtual keyboard to the virtual trackpad, or remove the virtual keyboard from the lower screen.

In some embodiments, performing the function comprises causing an object to be displayed in an area of the selected user interface to which the user input is applied, wherein the area corresponds to a location on the selected user interface at which the user input is applied.

Therefore, according to some embodiments, a user may be able to rapidly transition between interacting with a virtual keyboard and interacting with a virtual trackpad, for example, without excessive repositioning of the user's hand.

In some embodiments, causing the object to be displayed comprises causing the selected user interface to display a virtual keyboard, a virtual drawing pad, or a virtual trackpad.

Therefore, according to some embodiments, a user may be able to rapidly and efficiently transition between inputting text and operating a cursor on the user interface, without having to excessively reposition their hand.

In some embodiments, performing the function comprises: causing the selected user interface to no longer display at least a portion of a virtual keyboard and to display a virtual trackpad; or causing the selected user interface to no longer display at least a portion of a virtual trackpad and to display a virtual keyboard.

In some embodiments, the first user interface is rotatable relative to the second user interface.

For example, according to some embodiments, the computing device may be a dual-screen laptop or similar device, wherein a first touch-sensitive screen of the laptop is coupled to and rotatable relative to the second touch-sensitive screen of the laptop.

In some embodiments, said performing the function comprises comparing the force to a preset force threshold.

For example, according to some embodiments, mode switching or some other function may be performed if the force associated with the user input is determined to be above the preset threshold (for example, in the case of the user input being a finger chord or an eraser end of a stylus contacting the selected user interface), or below the preset threshold (for example, in the case of the user input being a finger swipe).

In some embodiments, detecting the user input comprises detecting a plurality of locations on the selected one of the first and second user interfaces at which the user input is applied; and determining the force of the user input comprises: determining a plurality of forces with which the user input is applied at the plurality of locations; and determining an average force based on the plurality of forces.

For example, in the case of a user providing a multi-finger touch operation to the selected user interface (e.g. the user simultaneously contacts the selected user interface with multiple fingers from one or both of their hands), then the computing device may determine a plurality of forces exerted by the fingers contacting the user interface, and determine an average force of all the individual forces for use.

In some embodiments, the user input comprises multiple finger contacts.

For example, all four fingers and a user's thumb from one of their hands may simultaneously contact the selected user interface. Alternatively, all eight fingers and both of the user's thumbs may simultaneously contact the selected user interface in order to provide the user input required to effect mode switching. Any other suitable finger chord may be used to control mode switching. In order to be able to use such finger chords, the user may pre-record the finger chord by applying it to the selected user interface during a calibration phase (e.g. when instructing the computing device to associate the specific finger chord in question with mode switching).

In some embodiments, the user input comprises at least one of one or more finger contacts and at least one stylus contact on or in proximity with the selected user interface.

In some embodiments, said detecting the user input comprises detecting a duration over which the user input is applied to the selected user interface; and said determining the force comprises determining an average force with which the user input is applied to the selected user interface over the duration.

For example, when moving one's finger or fingers in continuous contact with the selected user interface, the force exerted by the finger or fingers may not be constant. In such a case, the force determined by the computing device may be the force exerted by the finger or fingers averaged over the duration of the swipe gesture.

In some embodiments, the user input comprises at least one of one or more finger contacts and at least one stylus contact on or in proximity with the selected user interface and moving in continuous contact with and across the selected user interface.

In some embodiments, said determining the type of the user input comprises determining a geometry pattern on the selected one of the first and second user interfaces at which the user input is applied.

In some embodiments, determining the type of the user input comprises comparing the geometry pattern of the user input to one or more gesture types, each gesture type being associated with a corresponding pattern.

For example, one or more sensors, such as capacitive sensors, may detect a pattern or a shape corresponding to the contact of the user's fingers or a stylus with the selected user interface. The detected pattern may then be compared to one or more stored patterns (for example stored onboard a memory of the computing device). Based on the comparison, the computing device may determine whether the applied user input corresponds (e.g. is sufficiently similar to) one or more pre-stored user inputs that the user previously registered with the device (e.g. during a calibration phase) as being required for triggering mode switching.

In some embodiments, the one or more gesture types are associated with one or more of: a pattern corresponding to a finger chord; a pattern corresponding to a finger swipe; a pattern corresponding to a fist; a pattern corresponding to an open palm; a pattern corresponding to an end of a non-finger object contacting the selected user interface; and a pattern corresponding to a body of a stylus contacting the selected user interface.

For example, a fist bump may correspond to either the user's proximal phalanges contacting the selected user interface, or a side of the user's fist contacting the selected user interface. An open palm may correspond to the user's open palm, with fingers extended outwardly, contacting the selected user interface.

In some embodiments, the non-finger object is a stylus.

In some embodiments, the end of the stylus comprises an end that is not used for writing.

In some embodiments, the user input comprises a finger chord, and said determining the type of the user input comprises determining that the geometry pattern of the one or more locations represents contacts of a plurality of fingers of a user's hand.

In some embodiments, the user input comprises a finger swipe, and said determining the type of the user input comprises determining whether a location on the selected user interface at which the user input is initially applied has moved a predetermined distance along the selected user interface within a predetermined amount of time.

As described in further detail below, mode switching may be triggered based on either an absolute rate of movement of the users finger or fingers over the surface of the selected user interface, or a rate of movement of the user's finger or fingers over the surface of the selected user interface relative to a size of the selected user interface.

In some embodiments, the method further comprises determining a region on the selected user interface at which the user input is applied; and said performing the function by the computing device is further based on the determined region.

In some embodiments, said determining the region comprises determining whether the user input is applied to a region on the selected user interface that corresponds to a displayed virtual keyboard or a displayed virtual trackpad.

Thus, mode triggering may only be initiated if the user input is received at one or more predetermined locations on the selected user interface. For example, mode triggering may only be initiated if the user input is received at a virtual keyboard or a virtual trackpad, or some other specific object or preset region on the selected user interface. The specific region(s) that may have to receive the user input in order to trigger mode switching may be configured by the user.

In some embodiments, said detecting the user input applied to the selected user interface comprises detecting an object in proximity to the selected user interface but not in contact with the first user input.

According to one aspect of this disclosure, there is provided one or more non-transitory computer-readable storage media comprising computer-executable instructions; the instructions, when executed, cause a processor to perform: detecting a user input applied to one of a first and a second touch-sensitive user interface; determining a force of the user input; determining a type of the user input; and performing a function by the computing device based the force, the type of the user input, and a determination that the user input is applied to a selected one of the first and second user interfaces According to one aspect of this disclosure, there is provided a computing device comprising: a first and a second touch-sensitive user interfaces; one or more computer-readable storage media; and one or more processors communicative with the one or more computer-readable storage media and the first and second touch-sensitive user interfaces for: detecting a user input applied to one of the first and second user interfaces; determining a force of the user input; determining a type of the user input; and performing the function by the computing device based on the force, the type of the user input, and a determination that the user input is applied to a selected one of the first and second user interfaces.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which:

FIGS. 10A-10I show a flow diagram of different states of a user interface triggered in response to mode switching, according to an embodiment of the disclosure;

FIGS. 11A-11K show a flow diagram of different states of a user interface triggered in response to mode switching, according to an embodiment of the disclosure;

FIGS. 14A-14I show a flow diagram of different states of a user interface triggered in response to mode switching, according to an embodiment of the disclosure; and FIGS. 15A and 15B show a flow diagram of different states of a user interface triggered in response to mode switching, according to an embodiment of the disclosure.

DETAILED DESCRIPTION

The present disclosure provides a method, device, and computer-readable storage medium for causing a computing device to perform a function, such as switching between different modes, based on a user input applied to a user interface. The user interface may comprise, for example, a touch-sensitive screen, a touch-sensitive surface, or a graphical user interface (which may be briefly referred to as GUI below) of the computing device. The present disclosure further provides a computing device capable of such functionality. While various embodiments of the disclosure are described below, the disclosure is not limited to these embodiments, and variations of these embodiments may well fall within the scope of the disclosure.

Herein, a user interface refers to a touch-sensitive screen or surface that may comprise a display of the computing device that a user may interact with (for example, viewing if the screen is a screen without touch-sensing functionality, or viewing and inputting if the screen is a touch-sensitive screen (also called a touchscreen)).

As will be described in more detail later, the user may apply suitable gestures on a touch-sensitive screen to trigger mode switching. In some embodiments, the computing device only comprises a single, touch-sensitive screen. In some embodiments, the computing device may comprise a plurality of screens with at least one of the screens being a touchscreen. For example, in one embodiment, the computing device may comprise two screens with at least one of the two screens being a touchscreen, and the two screens are rotatable relative to each other.

Embodiments of the disclosure may be applied to an electronic computing device, as will now be described in further detail in connection with FIG. 1. The following describes the computing device, a user interface configured for the computing device, and embodiments for using the computing device.

In some embodiments, the computing device may be a portable computing device, such as a tablet computer or a laptop with one or more touch-sensitive surfaces (for example, one or more touch panels). An example embodiment of the portable computing device includes but is not limited to a portable computing device using iOS@ (IOS is a trademark or registered trademark of CISCO SYSTEMS, INC. of San Jose, CA, USA, and is used by Apple Inc., Cupertino, CA, USA under license), Android® (ANDROID is a trademark or registered trademark of Google Inc., Mountain View, CA, USA), Microsoft®, or some other operating system. It should be further understood that, in other embodiments of this disclosure, the computing device may alternatively be a desktop computer with one or more touch-sensitive surfaces (for example, one or more touch panels), and may comprise other input tools such as a physical keyboard and/or a physical computer mouse.

Figure 1:
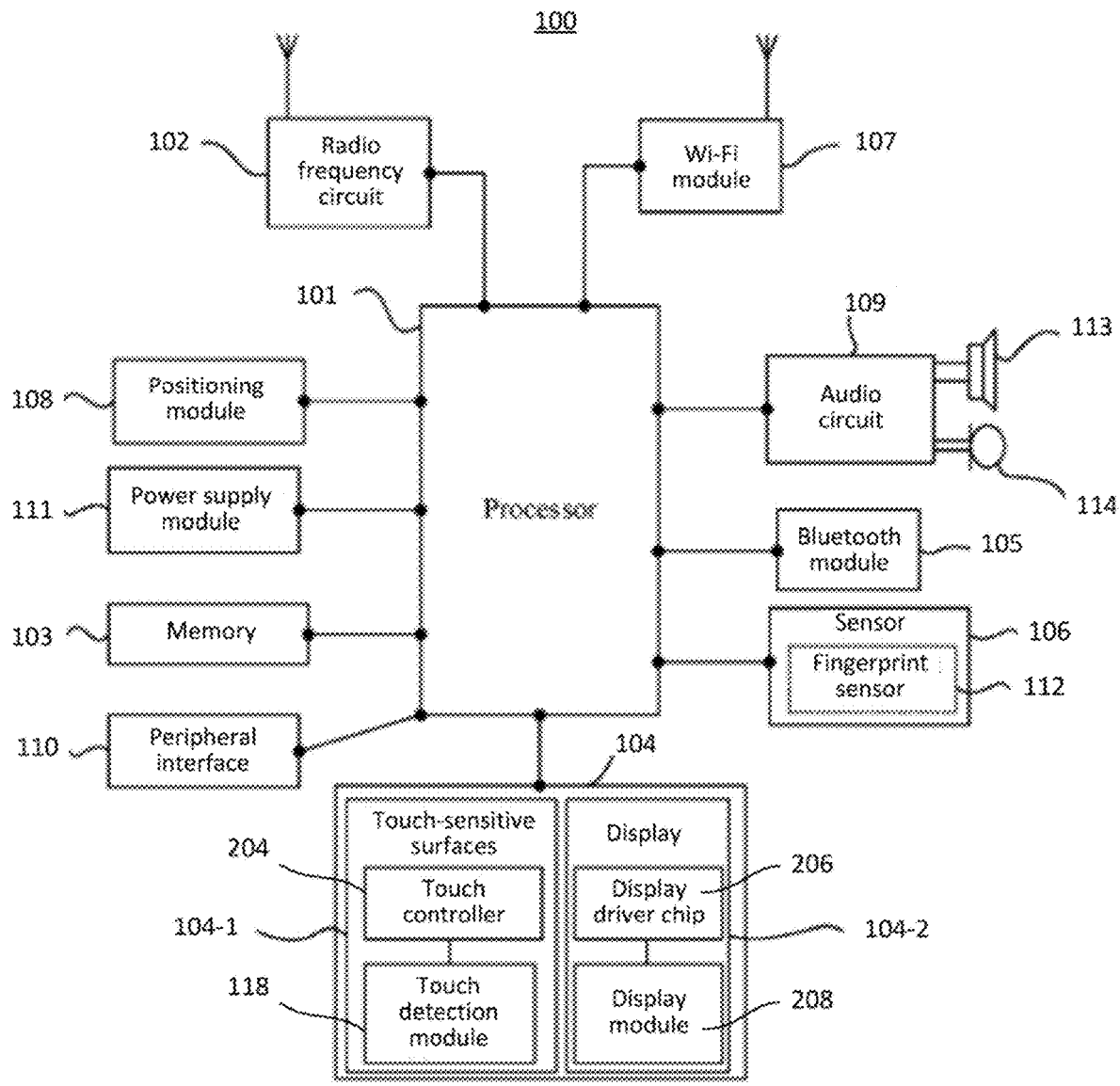
FIG. 1 is a schematic diagram of a computing device according to an embodiment of the disclosure.

For example, as shown in FIG. 1, the computing device according to embodiments of this disclosure may be a portable computing device 100 such as a dual-screen laptop 100. The following specifically describes an embodiment of using computing device 100 as an example. It should be understood that computing device 100 shown in the figure is merely an example of possible computing devices that may perform the methods described herein, and computing device 100 may have more or fewer components than those shown in the figure, or may combine two or more components, or may have different component configurations. Various components shown in the figure may be implemented in hardware, software, or a combination of hardware and software that include one or more signal processing and/or application-specific integrated circuits.

As shown in FIG. 1, computing device 100 may specifically include components such as one or more processors 101, a radio frequency (RF) circuit 102, a memory 103, touchscreens 104, a Bluetooth® module 105 (BLUETOOTH is a registered trademark of Bluetooth Sig Inc., Kirkland, WA, USA), one or more sensors 106 such as fingerprint sensor 112, a Wi-Fi® module 107 (WI-FI is a registered trademark of Wi-Fi Alliance, Austin, TX, USA), a positioning module 108, an audio circuit 109, a peripheral interface 110, and a power supply module 111. These components may communicate with each other by using one or more communications buses or signal cables (not shown in FIG. 1). A person skilled in the art may understand that a hardware structure shown in FIG. 1 does not constitute a limitation on computing device 100, and computing device 100 may include more or fewer components than those shown in the figure, may combine some components, or may have different component arrangements.

The following describes in detail the components of portable computing device 100 with reference to FIG. 1.

Processor 101 is a control center of the portable computing device 100. Processor 101 is connected to each part of portable computing device 100 by using various interfaces and lines, and performs various functions of portable computing device 100 and processes data by running or executing an application stored in memory 103, and invoking data and an instruction that are stored in memory 103. For example, when mode switching is triggered, processor 101 may cause one or more of displays or display screens 104-2 of portable computing device 100 to no longer display a virtual keyboard and to commence displaying a virtual trackpad, or vice versa.

In some embodiments, processor 101 may include one or more processing units. An application processor and a modem processor may be integrated into processor 101. The application processor mainly processes an operating system, a user interface, an application, and the like, and the modem processor mainly processes wireless communication. It should be understood that the modem processor does not have to be integrated in processor 101. For example, processor 101 may be a Kirin chip 970 manufactured by Huawei Technologies Co., Ltd. In some other embodiments of this disclosure, processor 101 may further include a fingerprint verification chip, configured to verify a collected fingerprint.

RF circuit 102 may be configured to receive and send a radio signal in an information receiving and sending process or a call process. Specifically, RF circuit 102 may receive downlink data from a base station, and then send the downlink data to processor 101 for processing. In addition, RF circuit 102 may further send uplink-related data to the base station. Generally, RF circuit 102 includes but is not limited to an antenna, at least one amplifier, a transceiver, a coupler, a low noise amplifier, a duplexer, and the like. In addition, RF circuit 102 may further communicate with another device through wireless communication. The wireless communication may use any communications standard or protocol, including but not limited to a global system for mobile communications, a general packet radio service, code division multiple access, wideband code division multiple access, long term evolution, an SMS message service, and the like.

Memory 103 is configured to store an application and data. Processor 101 runs the application and the data that are stored in memory 103, to perform the various functions of portable computing device 100 and data processing. Memory 103 mainly includes a program storage area and a data storage area. The program storage area may store the operating system, an application required by at least one function, and the like. The data storage area may store data created based on use of the portable computing device 100. In addition, memory 103 may include a high-speed random access memory, and may further include a non-volatile memory, for example, a magnetic disk storage device, a flash memory device, or another non-volatile solid-state storage device. Memory 103 may store various operating systems such as an iOS® operating system developed by Apple Inc. and an Android® operating system developed by Google Inc. In addition, memory 103 may store various applications, such as Adobe Illustrator®. It should be noted that one or more of the applications may alternatively be stored in a cloud, in which case portable computing device 100 obtains the applications from the cloud.

Touchscreens 104 may include respective touch-sensitive surfaces 104-1 and displays 104-2. Touch-sensitive surfaces 104-1 (for example, a touch panel) may collect a touch event performed thereon by the user of the portable computing device 100 (for example, a physical operation performed by the user on touch-sensitive surfaces 104-1 by using any suitable object such as a finger or a stylus), and send collected touch information to another component, for example, processor 101. Touch-sensitive surfaces 104-1 on which the user input or touch event is received may be of a capacitive type, an infrared light sensing type, an ultrasonic wave type, or the like. Touch-sensitive surfaces 104-1 may include two parts: a touch detection module 118 and a touch controller 204. The touch detection module 118 detects a signal generated by a touch operation, and transmits the signal to the touch controller 204. The signal generated by the touch operation may include a force with which the user input is physically applied to the touch-sensitive surface 104-1. The touch controller 204 receives touch information from the touch detection module 118, converts the touch information into touch point coordinates, and sends the touch point coordinates to processor 101. The touch controller 204 may further receive an instruction sent by processor 101, and execute the instruction.

Displays (also referred to as display screens) 104-2 may be configured to display information entered by the user or information provided for the user, and various menus of the portable computing device 100. For example, displays 104-2 may further include two parts: a display driver chip 206 and a display module 208. The display driver chip 206 is configured to receive a signal or data sent by processor 101, to drive a corresponding screen to be displayed on the display module 208. For example, when detecting that mode switching has been triggered, processor 101 may instruct display driver chip 206 to alter the visual features of the display currently shown on one or both of displays 104-2. After receiving the to-be-displayed related information sent by processor 101, the display driver chip 206 processes the information, and drives, based on the processed information, the display module 208 to turn on a corresponding pixel and turn off another corresponding pixel, to implement the mode switch requested by processor 101.

For example, in this embodiment of this application, the display module 208 may be configured by using an organic light-emitting diode (organic light-emitting diode, OLED). For example, an active matrix organic light emitting diode (active matrix organic light emitting diode, AMOLED) is used to configure the display module 208. In this case, the display driver chip 206 receives related information that is to be displayed after the screen is turned off and that is sent by the processor 101, processes the to-be-displayed related information, and drives some OLED lights to be turned on and the remaining OLEDs to be turned off, to implement the mode switching functionality.

Touch-sensitive surfaces 104-1 may cover displays 104-2. Although in FIG. 1 touch-sensitive surfaces 104-1 and display screens 104-2 are used as two independent components to implement input and output functions of portable computing device 100, in some embodiments, touch-sensitive surfaces 104-1 and display screens 104-2 may be integrated to implement the input and output functions of portable computing device 100. It may be understood that touchscreens 104 are formed by stacking a plurality of layers of materials. Only the touch-sensitive surface (layer) 104-1 and the display screen (layer) 104-2 are presented in this embodiment of the disclosure, and other layers are not described in detail in this embodiment of the disclosure. In addition, in some other embodiments of the disclosure, touch-sensitive surfaces 104-1 may cover displays 104-2, and a size of touch-sensitive surfaces 104-1 is greater than a size of display screens 104-2. Therefore, display screens 104-2 are entirely covered by touch-sensitive surfaces 104-1. Alternatively, touch-sensitive surfaces 104-1 may be disposed on a front side of portable computing device 100 in a full panel form. In other words, any touch applied by the user on the front side of portable computing device 100 can be sensed by portable computing device 100. In this way, full touch control experience on the front side of portable computing device 100 can be implemented. In some other embodiments, touch-sensitive surfaces 104-1 are disposed on the front side of portable computing device 100 in a full panel form, and the display screens 104-2 may alternatively be disposed on the front side of portable computing device 100 in a full panel form. In this way, a bezel-less structure can be implemented on the front side of portable computing device 100. In some other embodiments, touchscreens 104 may further include a series of pressure sensor arrays, so that portable computing device 100 can sense pressure exerted on touchscreens 104 by the touch event.

Portable computing device 100 may further include Bluetooth® module 105 configured to exchange data between portable computing device 100 and another electronic device (for example, a mobile phone or a smartwatch) over a short distance. In embodiments of this disclosure, Bluetooth® module 105 may be an integrated circuit, a Bluetooth chip, or the like.

Wi-Fi® module 107 is configured to provide portable computing device 100 with network access that complies with a related Wi-Fi® standard protocol. Portable computing device 100 may access a Wi-Fi® access point by using the Wi-Fi® module 107, to help the user receive and send an e-mail, browse a web page, access streaming media, and the like. Wi-Fi® module 107 provides wireless broadband internet access for the user. In some other embodiments, Wi-Fi module 107 may alternatively serve as the Wi-Fi® wireless access point, and may provide Wi-Fi® network access for another electronic device.

Audio circuit 109, loudspeaker 113, and microphone 114 may provide an audio interface between the user and portable computing device 100. Audio circuit 109 may transmit an electrical signal converted from received audio data to loudspeaker 113, and loudspeaker 113 converts the electrical signal into a sound signal for outputting. In addition, microphone 114 converts a collected sound signal into an electrical signal, and audio circuit 109 converts the electrical signal into audio data after receiving the electrical signal, and then outputs the audio data to radio frequency circuit 102 to send the audio data to, for example, a mobile phone, or outputs the audio data to memory 103 for further processing.

Peripheral interface 110 is configured to provide various interfaces for an external input/output device (for example, a physical keyboard, a physical mouse, a display externally connected to portable computing device 100, an external memory, or a subscriber identity module card). For example, a mouse is connected by using a universal serial bus interface, and a subscriber identity module (subscriber identity module, SIM) card provided by a telecommunications operator is connected by using a metal contact in a subscriber identity module card slot. Peripheral interface 110 may be configured to couple the external input/output peripheral device to processor 101 and memory 103.

Portable computing device 100 may further include power supply module 111 (for example, a battery and a power supply management chip) that supplies power to the components. The battery may be logically connected to processor 101 by using the power supply management chip, so that functions such as charging management, discharging management, and power consumption management are implemented by using power supply apparatus 111.

The following embodiments may all be implemented on an electronic device (for example, portable computing device 100) with the foregoing hardware structure.

The following describes in detail embodiments of the disclosure by using portable computing device 100 shown in FIG. 1 as an example.

Figure 2:
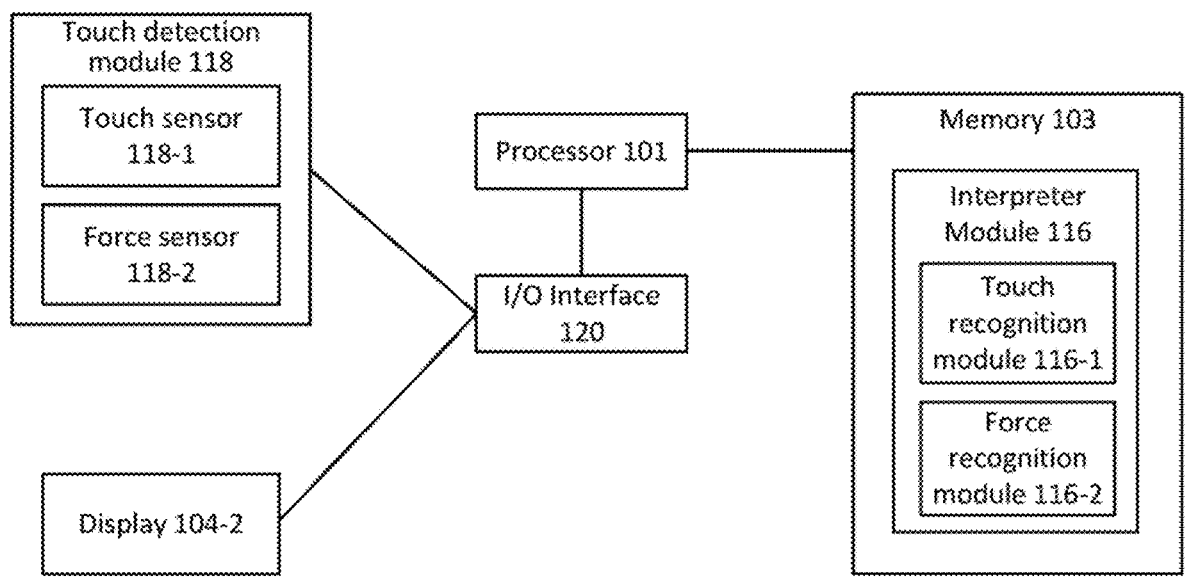
FIG. 2 is a further schematic diagram of the computing device of FIG. 1.

Turning to FIG. 2, there is shown a further schematic diagram of certain hardware components of portable computing device 100, according to an embodiment of the disclosure. Some of the components, such as processor 101, have already been described in connection with FIG. 1. As can be seen from FIG. 2, a touch detection module 118 forms part of each touch-sensitive surface 104-1 of each touchscreen 104. Touch detection module 118 includes one or more touch sensors 118-1 and one or more force sensors 118-2. Touch sensors 118-1 may detect, using for example capacitive sensing, a signal generated by a touch operation. The signal may be indicative of a type of user input that is applied to touchscreen 104. Force sensors 118-2 may detect a force which the user input or touch operation is applied to touchscreen 104. The signals generated by touch sensors 118-1 and force sensors 118-2 are passed to an input/output interface 120 which passes the signals on to processor 101. Processor 101, communicating with memory 103, may access an interpreter module 116 stored in memory 103 in order to process the signals sent by touch sensors 118-1 and force sensors 118-2.

In particular, interpreter module 116 includes a touch recognition submodule 116-1 that may determine, based on the signal generated by touch sensors 118-1, the type of user input that is applied to touchscreen 104. For example, touch recognition submodule 116-1 may compare the signal generated by touch sensors 118-1 to one or more preset signals stored on memory 103, to determine whether the type of user input that is applied to touchscreen 104 corresponds to one or more preset user inputs (which may also be referred to as "gesture types" throughout this disclosure). In some embodiments, a gesture type may be determined based on the number of touch points, the geometry pattern of touch points, the size(s) of one or more touch points, the movement(s) (e.g., direction(s), speed(s), distance(s), and/or the like) of one or more touch points, the specific touchscreen (if a plurality of touchscreens 104 are used) on which the touch points are applied, and/or the like.

Furthermore, interpreter module 116 includes a force recognition submodule 116-2 that may determine, based on the signal generated by force sensors 118-2, the force with which the user input is applied to touchscreen 104. For example, force recognition submodule 116-2 may compare the signal generated by force sensors 118-2 to one or more preset force thresholds stored on memory 103, to determine whether the force with which the user input is applied to touchscreen 104 exceeds the one or more preset force thresholds.

Based on the determined type of user input and the determined force associated with the user input, processor 101 may determine whether to perform a mode switching function, or some other function. For example, if the user input is received at a first one of displays 104-2, then processor 101 may instruct that same display 104-2 to transition from a first mode, in which for example a virtual keyboard is being displayed, to a second mode, in which for example a virtual trackpad is displayed instead of the virtual keyboard. The change in display may be effected by the display driver chip 206 that receives the instruction from processor 101, as described in further detail above.

Figure 3:
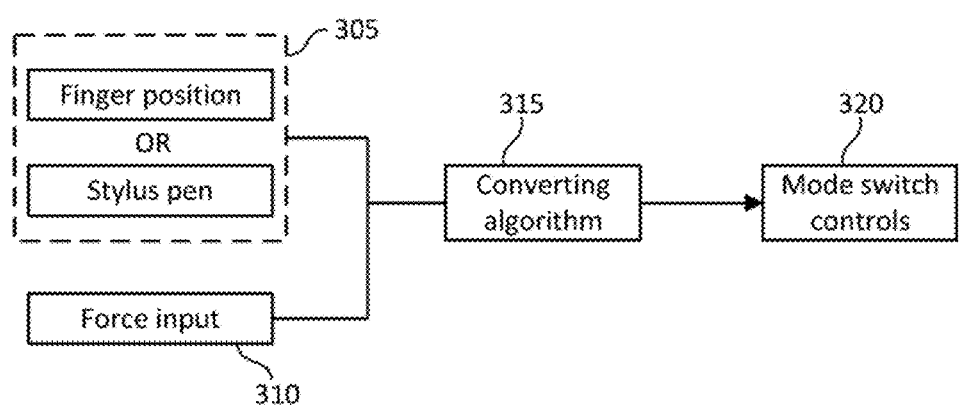
FIG. 3 is a schematic block diagram showing inputs comprising a type of gesture, and a force, being used to initiate mode switching, in accordance with an embodiment of the disclosure.

Turning to FIG. 3, there is shown a schematic block diagram of a process by which processor 101 determines whether to perform mode switching. At block 305, a user input is received at a selected one of touchscreens 104. The user input may, for example, correspond to a stylus contacting touchscreen 104, to a fist bump contacting touchscreen 104, or to multiple finger tips simultaneously or substantially simultaneously contacting touchscreen 104. As those skilled in the art will appreciate, the type of user input may be identified via various suitable methods. For example, a stylus may comprise a contact switch which, when the stylus contacts the touchscreen 104, is turned to a closed state to trigger the transmission of an indicative signal indicating the contact of the stylus on the touchscreen 104. On the other hand, a contact on the touchscreen 104 without any indicative signal may be detected as a finger contact or a fist-bump contact, wherein the finger contact and the fist-bump contact may be differentiated by measuring the size of the contact. For example, if the size of the contact is greater than a predefined size threshold, then the contact may be a fist-bump contact; otherwise, the contact is a finger contact.

At block 310, a force associated with the user input is also determined by force sensors 118-2, as described above. At block 315, the type of user input and the force associated with the user input is used as an input to a converting algorithm stored for example on interpreter module 116. Processor 101, communicating with interpreter module 116, may then determine at block 320 whether to perform mode switching. Note that, according to some embodiments, mode switching may be performed using only the specific gesture type that is received at touchscreen 104 as an input to the converting algorithm. In other words, if the gesture that is detected at touchscreen 104 is determined to be of a certain type (as determined by processor 101 by comparing the detected gesture type to stored gesture types stored within memory 103), then processor 101 may determine that mode switching is to be performed.

There will now be described example methods of performing mode switching using portable computing device 100. It shall be understood by the skilled person that the following embodiments are exemplary in nature, and that the methods may include fewer or a greater number of steps while still enabling mode switching within the scope of the present disclosure.

Figure 4A:
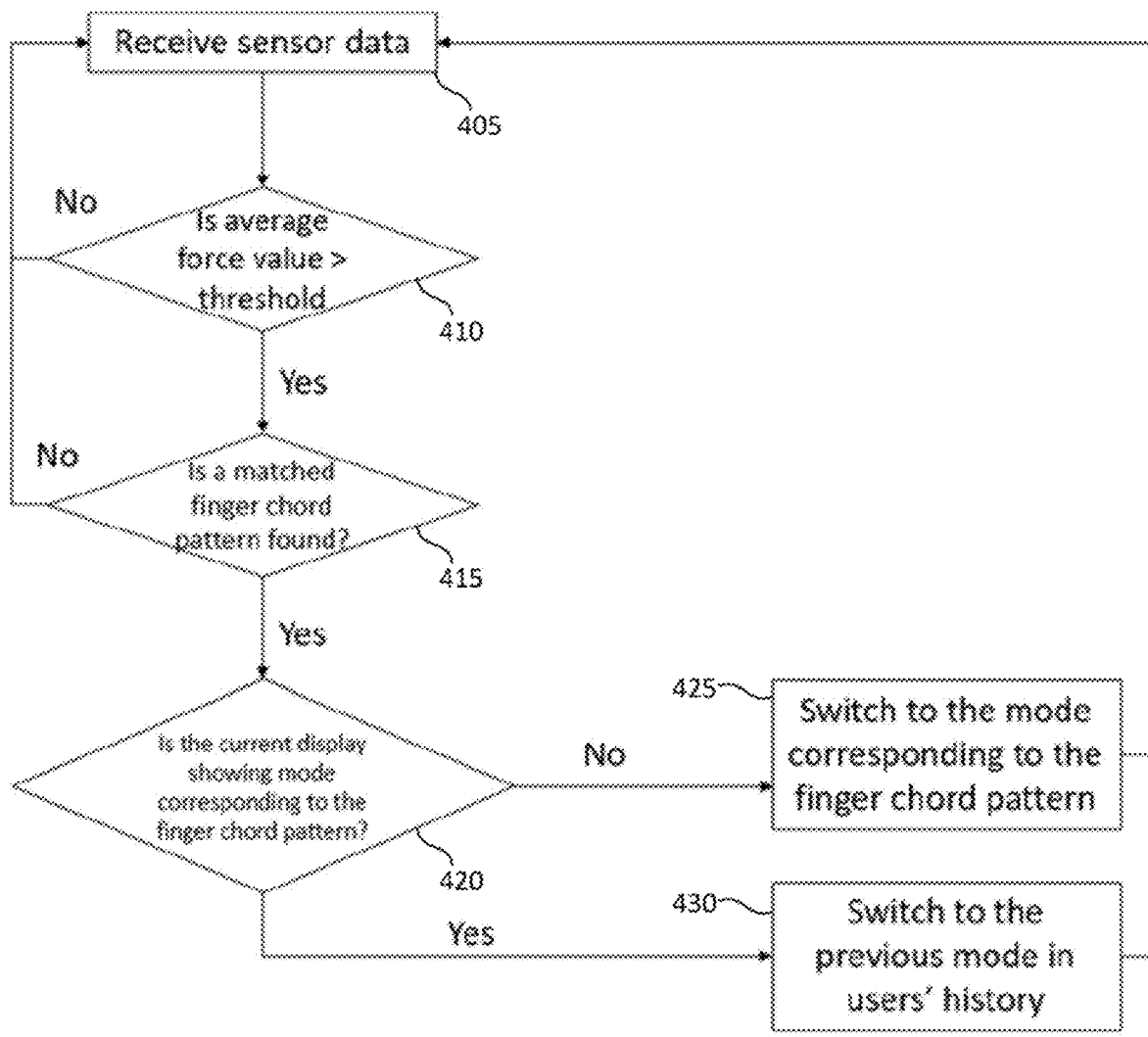
FIG. 4A is a flow diagram of a method of performing mode switching in response to a finger chord contacting a user interface, according to an embodiment of the disclosure.
Figure 4B:
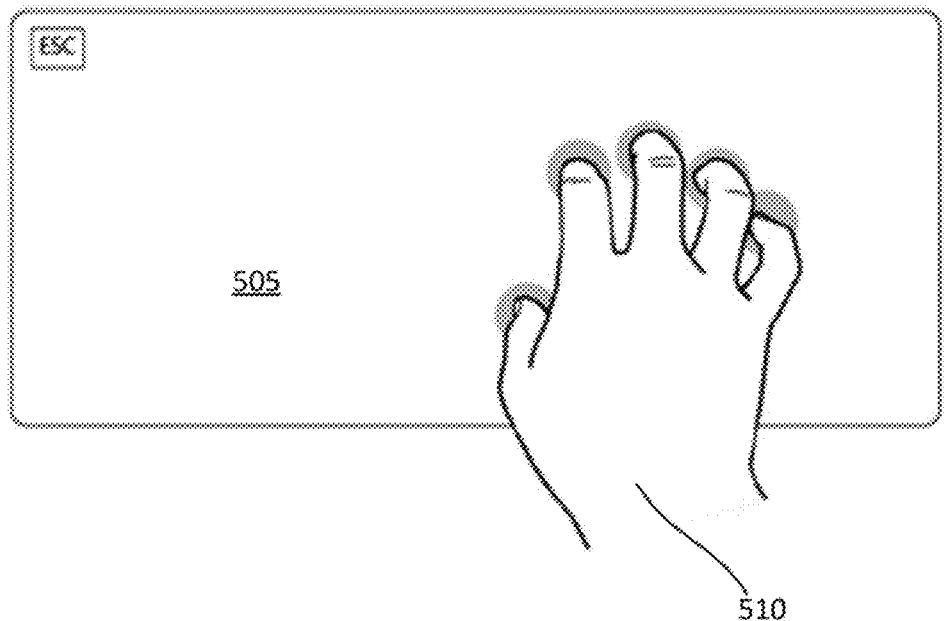
FIG. 4B is a schematic diagram showing a user input in the form of a finger chord being applied to a user interface, according to an embodiment of the disclosure.

Turning to FIG. 4A, there is shown a block diagram of a method of performing mode switching in which a user provides to touchscreen 104 a user input that corresponds to a finger chord. An example of a finger chord can be seen in FIG. 4B. FIG. 4B shows a virtual keyboard 505 (with the majority of the keys removed for clarity) displayed by touchscreen 104. A user's four fingers and thumb on a single hand 510 are seen to simultaneously contact and apply pressures or forces to virtual keyboard 505. Further examples of finger chords are described in more detail below.

Returning to FIG. 4A, at block 405, touch sensor 118-1 generates one or more signals depending on the one or more touch points the user applied to touchscreen 104 and force sensor 118-2 generates one or more signals depending on the force with which the user input is applied to touchscreen 104 at the one or more touch points. For example, force sensor 118-2 and touch sensor 118-1 may detect the sizes, shapes, and the forces of the areas of touchscreen 104 that have been contacted. At block 410, processor 101, communicating with force recognition submodule 116-2 of interpreter module 116, determines whether the force applied by the user input is greater than a stored force threshold. For example, processor 101 may calculate the average force applied to touchscreen 104 by all of the users fingers and thumb in contact with touchscreen 104. The "average" force may be, for example, a mean, a mode, or a median of the individual forces associated with each finger/thumb contacting touchscreen 104. Of course, those skilled in the art will appreciate that other suitable calculations of the average force (for example, the maximum of individual forces, weighted average of individual forces, or the like) may be used herein.

In the case of a first bump, according to some embodiments, a force applied by the fist bump may be determined based on an average of individual forces applied per unit area of touchscreen 104 that is contacted by the fist bump. For example, force sensor 118-2 may determine an individual force applied to each unit of area (such as a square centimeter) of touchscreen 104 by the fist bump, and may then determine an average of the forces. The "average" force may be, for example, a mean, a mode, or a median of the individual forces associated with each unit area of touchscreen 104 that is contacted by the fist bump.

If the force applied by the user input is determined to not be greater than the stored force threshold, then it is determined that the user did not intentionally apply the finger chord to touchscreen 104, and that the user does not wish to effect mode switching. In such a case, the process may return to block 405, whereupon processor 101 waits for a subsequent user input to be provided to touchscreen 104.

If the force applied by the user input is determined to be greater than the stored force threshold, then at block 415, processor 101, communicating with touch recognition submodule 116-1 of interpreter module 116, determines whether the type of the user input corresponds to one or more stored gesture types. The stored gesture types may be stored, for example, within a library of gesture types stored within memory 103. If the type of the user input does not correspond to one or more of the stored gesture types, then it is determined by processor 101 that the user does not wish to effect mode switching. In such a case, the process may return to block 405, whereupon processor 101 waits for a subsequent user input to be provided to touchscreen 104.

If the type of the user input corresponds to one or more of the stored gesture types, then processor 101 may determine that mode switching is to proceed. In such a case, at block 420, processor 101 may determine whether the current display mode of touchscreen 104 corresponds to a display mode registered with the finger chord applied to touchscreen 104. For example, portable computing device 100 may be configured, during a calibration phase, such that detection of the five-finger chord shown in FIG. 4B is to result in touchscreen 104 displaying virtual keyboard 505. Therefore, if processor 101 determines that touchscreen 104 is not currently displaying a virtual keyboard, then at block 425 processor 101 may cause touchscreen 104 to display a virtual keyboard.

If, on the other hand, processor 101 determines that touchscreen 104 is already displaying a virtual keyboard, then, at block 430, processor 101 may cause touchscreen 104 to transition to the most recent prior display mode in the user's mode-switching history. For example, if touchscreen 104 was previously displaying a virtual trackpad immediately prior to displaying virtual keyboard 505, then processor 101 may cause touchscreen 104 to cease display of virtual keyboard 505 and display instead the virtual trackpad. According to another example embodiment, if touchscreen 104 is currently displaying a virtual trackpad and if touchscreen 104 was previously displaying a virtual keyboard immediately prior to displaying the virtual trackpad, then processor 101 may cause touchscreen 104 to cease display of the virtual trackpad and display instead the virtual keyboard. The virtual keyboard or the virtual keypad may be caused to appear on touchscreen 104 in a location generally corresponding to the location where the user input was detected on touchscreen 104.

While the example of FIGS. 4A and 4B shows a four-finger and thumb ("five-finger") chord, the disclosure extends to detecting any other suitable finger chord or related pattern received at the display. For example, any user input comprising a combination of two or more fingers of one or both hands of the user may be used as a basis for initiating mode switching. Furthermore, a finger chord may be defined according to the relative positions of a combination of one or more of a user's fingers and another non-finger object, such as a stylus.

Furthermore, the user may customize and set up any desired mode-switching gesture types that are to be used as triggers for the mode switching. For example, the user may register four-finger chords, three-finger-chords, or other gesture types, such as for example a user input corresponding to a user's palm with fingers extended (that is an open palm), or a user's fist (such as fist bump), etc. as the mode-switching gesture types. In order to register such gesture types, during a calibration phase, the user may apply such user inputs to touchscreen 104, and portable computing device 100 may record and store in memory 103 one or more signals recorded in response to such gesture types or user inputs contacting touchscreen 104. Such signals may define different gesture types according to the different user inputs that are applied to touchscreen 104, and the gesture types may be stored within memory 103, to be subsequently accessed by touch recognition submodule 116-1.

Figure 5:
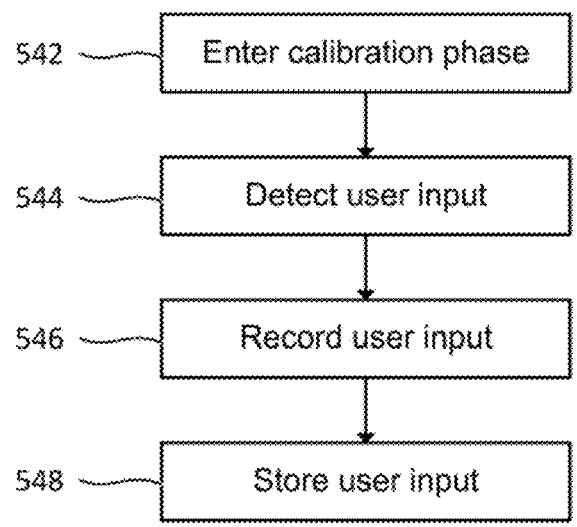
FIG. 5 shows a flow diagram of a method of registering new gesture types for use in mode switching, according to an embodiment of the disclosure.

For example, turning to FIG. 5, there is shown a flow diagram illustrating an embodiment of a method of recording user inputs to be used as mode-switching gesture types to trigger mode-switching. At block 542, computing device 100 enters a calibration phase. For example, computing device 100 may detect user input indicating that a user wishes to store on computing device 100 one or more user inputs that may be used to trigger mode switching. In response to detecting such user input, computing device 100 enters a calibration phase during which, for example, mode switching is prevented until the user indicates that they wish to exit the calibration phase. At block 544, computing device 100 detects a user input being applied to touchscreen 104. At block 546, computing device 100 records details of the user input. For example, computing device 100 may record a geometric pattern corresponding to one or more areas of touchscreen 104 that are contacted by the user input, a force with which the user input is applied to touchscreen 104, a duration of time that the user input is applied to touchscreen 104, and any other suitable parameters that may be associated with the user input. At block 548, computing device 100 stores such characteristics or parameters of the user input in one or more storage media of computing device 100. At block 1610, the calibration phase is ended, for example in response to computing device 100 detecting user input indicating that the user has completed registering new user inputs to be used for mode switching. Mode switching may now be triggered in response to computing device 100 detecting any of the user inputs recorded and stored during the calibration phase.

Furthermore, while the example of FIGS. 4A and 4B has been described in the context of mode switching between a virtual keyboard and a virtual trackpad, or vice versa, other types of mode switching are contemplated. For example, mode switching may trigger changing a volume of audio output by the computing device, or alternately displaying/hiding a video progress bar.

Figure 6:
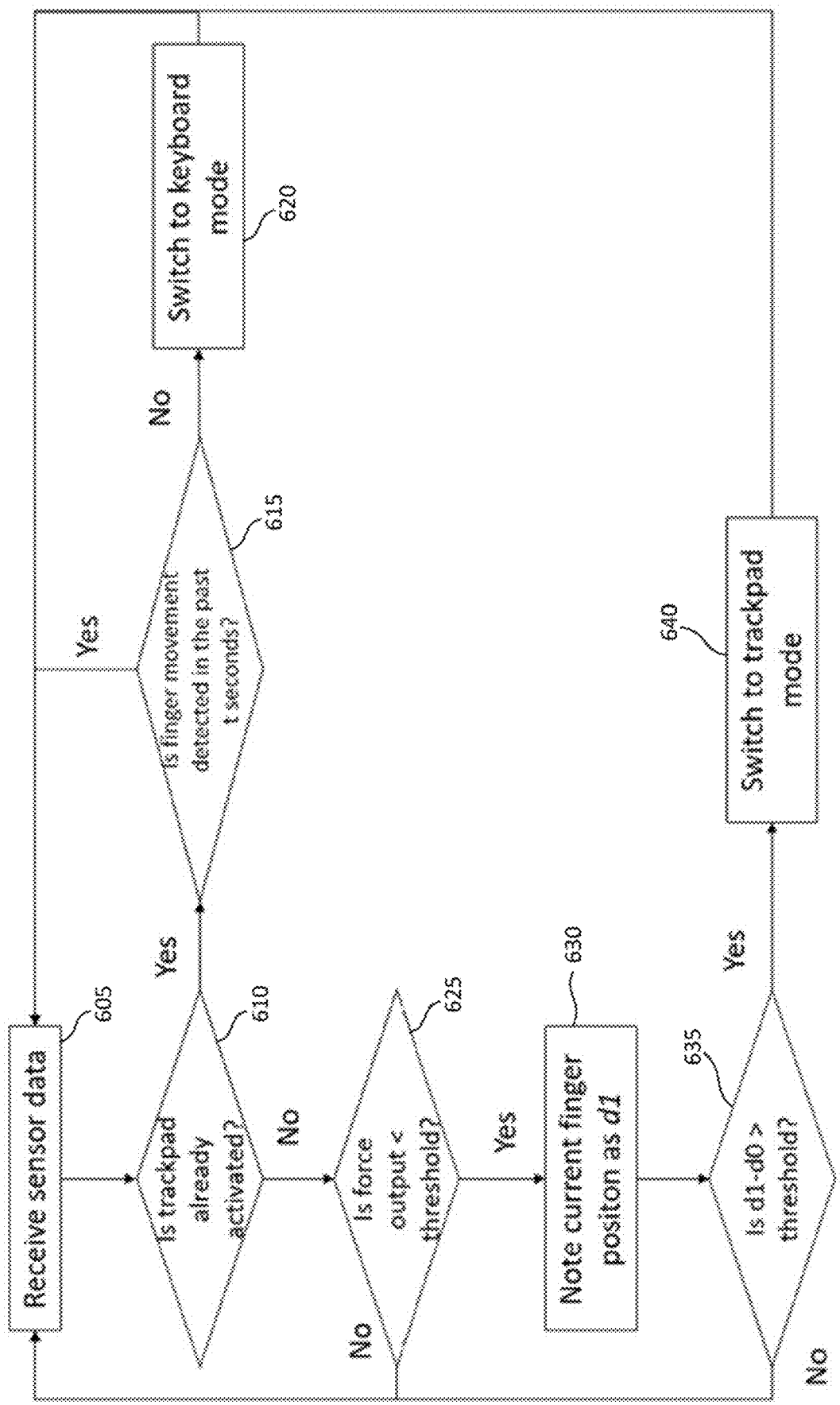
FIG. 6 is a flow diagram of a method of performing mode switching in response to a finger swipe being applied to a user interface, according to an embodiment of the disclosure.
Figure 7B:
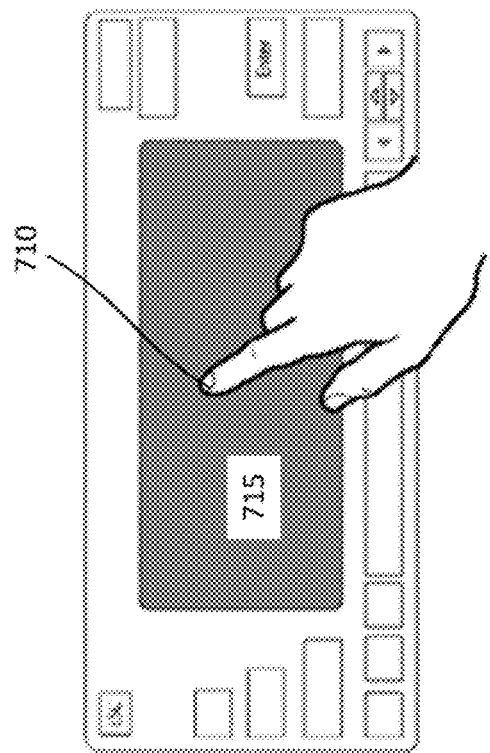
FIGS. 7A and 7B are schematic diagrams showing a user input in the form of a finger swipe being applied to a user interface, according to an embodiment of the disclosure.
Figure 7A:
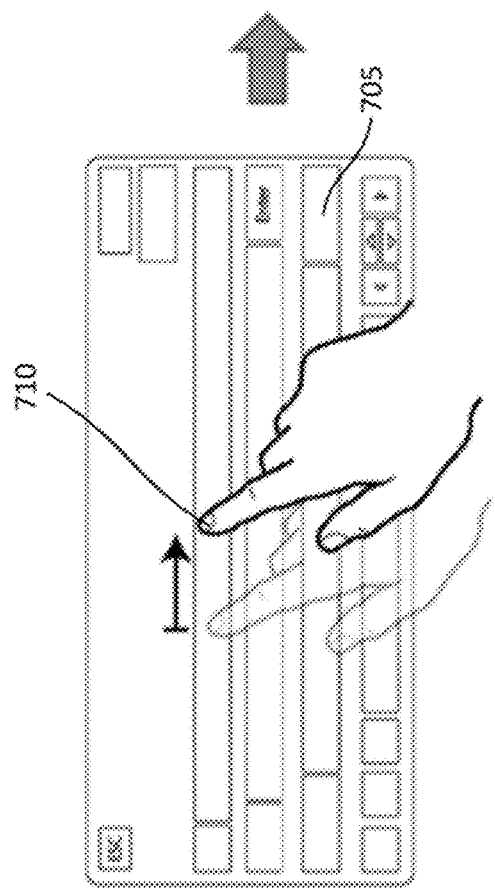

As shown in FIG. 6, there is shown another example of a method of performing mode switching, according to an embodiment of the disclosure. In this embodiment, mode switching is triggered in response to a finger swipe gesture of at least one finger (hereinafter referred to as a "finger swipe", for simplicity) being applied to touchscreen 104, wherein a force associated with the finger swipe are less than a preset threshold. An example of a finger swipe can be seen in FIGS. 7A and 7B, in which on the left-hand side, as shown in FIG. 7A, a user's fingertip 710 contacts an area of touchscreen 104 and moves across touchscreen 104, remaining in contact with touchscreen 104 for the duration of the gesture. Initially, as can be seen from the left-hand representation of touchscreen 104, a virtual keyboard 705 is displayed on touchscreen 104. After the finger swipe is detected and it is determined that the user wishes to switch display modes, touchscreen 104 changes display modes to display a virtual trackpad 715, as shown in FIG. 7B (right-hand representation of touchscreen 104).

As shown in FIG. 6, at block 605, force sensor 118-2 generates a signal depending on the force with which the user input is applied to touchscreen 104. Furthermore, touch sensor 118-2 generates a signal depending, for example, on the location or locations on touchscreen 104 at which the user input is detected to be in contact with touchscreen 104. For example, force sensor 118-2 and touch sensor 118-2 may detect the size, shape, and the force of the area of touchscreen 104 that has been contacted. At block 610, processor 101 determines whether touchscreen 104 is already displaying a virtual trackpad. If touchscreen 104 is already displaying a virtual trackpad, then at, block 615, processor 101 determines whether the user input applied to touchscreen 104 has been detected within a preset window of time (e.g. within, for example, the last minute). If so, then the process returns to block 605. If processor 101 determines that the user input applied to touchscreen 104 has not been detected within the preset window of time (i.e. the user input applied to touchscreen 104 is the first instance of user input being detected at touchscreen 104 within the preset window of time), then processor 101 may cause touchscreen 104 to switch display modes and cause touchscreen 104 to cease displaying at least a portion of virtual trackpad and display instead a virtual keyboard.

Returning to block 610, if touchscreen 104 is not already displaying a virtual trackpad, then, at block 625, processor 101, communicating with force recognition submodule 116-2 of interpreter module 116, determines whether the force with which the user input is applied to touchscreen 104 are less than a stored force threshold. For example, processor 101 may calculate the average force (e.g. the mean, mode, or median force) of the user input (e.g. the finger swipe) for the whole duration of the user input (that is, for the duration the user's finger or fingers are in contact with touchscreen 104). If the force applied by the user input are determined to not be less than the stored force threshold, then processor 101 may determine that the user does not wish to effect mode switching (e.g. the force with which the finger swipe is applied to touchscreen 104 is too great to trigger mode switching, since greater force correlates generally with a user wishing to deliberately strike a key). In such a case, the process may return to block 605, whereupon processor 101 waits for the subsequent user input to be provided to touchscreen 104.

If the force applied by the user input are determined to be less than the stored force threshold, then, at block 630, processor 101, communicating with touch recognition submodule 116-1 of interpreter module 116, determines a current position d1 on touchscreen 104 at which the finger contact is received. At block 635, processor 101 determines whether the distance the user's finger or fingers have moved between the finger's or fingers' initial contact point, d0, with touchscreen 104, and d1, is greater than a preset threshold. If it is determined that the distance between d1 and d0, e.g. d1–d0, is not greater than the preset threshold, then processor 101 may determine that the user does not intend to initiate mode switching. In such a case, the process may return to block 605, whereupon processor 101 waits for the subsequent user input to be provided to touchscreen 104. If on the other hand it is determined that the distance between d1 and d0, e.g. d1-d0, is greater than the preset threshold, then, at block 640, processor 101 may cause touchscreen 104 to switch display modes, in which case processor 101 may cause touchscreen 104 to display a virtual trackpad. The virtual trackpad may be caused to appear on touchscreen 104 in a location generally corresponding to the location where the gesture was detected on touchscreen 104. As can be seen in FIGS. 7A and 7B, in response to the finger swipe that is received at virtual keyboard 705, mode switching is triggered and virtual trackpad 715 replaces a portion of virtual keyboard 705.

In some embodiments, processor 101 may determine whether a relative movement distance is greater than a preset threshold. For example, in one embodiment, if processor 101 determines that (d1−d0)/W, wherein W is the width of the touchscreen 104, is greater than a preset threshold (e.g. at least 5% of W), then processor 101 may cause touchscreen 104 to switch display modes.

Thus, processor 101, communicating with force recognition submodule 116-2, may determine that a predetermined force criterion associated with the user input has been met, e.g. the force associated with the user input is less than a preset threshold. In addition, processor 101 may determine that a speed of movement of the user input in contact with touchscreen 104 is sufficient, in combination with the determined force associated with the finger swipe, to trigger mode switching. The speed of movement of the user input in contact with touchscreen 104 may be, for example, an absolute speed of movement (e.g. at least 1 cm of linear movement over 1 second) or, for example, a speed of movement that is relative, for example, to a dimension of touchscreen 104 (e.g. at least 5% of a width of touchscreen 104 over 1 second).

It should be noted that, in determining whether d1−d0 is greater than the preset threshold, processor 101 is effectively determining a type of the user input, e.g., processor 101 is effectively determining whether the user input is a finger swipe, and more particular a finger swipe that is sufficient in magnitude to trigger mode switching. The "magnitude" (for example, the above-described distance or speed threshold) of the finger swipe that is required to trigger mode switching may be configured by the user. For example, instead of triggering mode switching with a finger swipe that is defined by at least 1 cm of linear movement over 1 second, mode switching may be triggered with a finger swipe that is defined by at least 2 cm of linear movement over 1 second.

Figure 8:
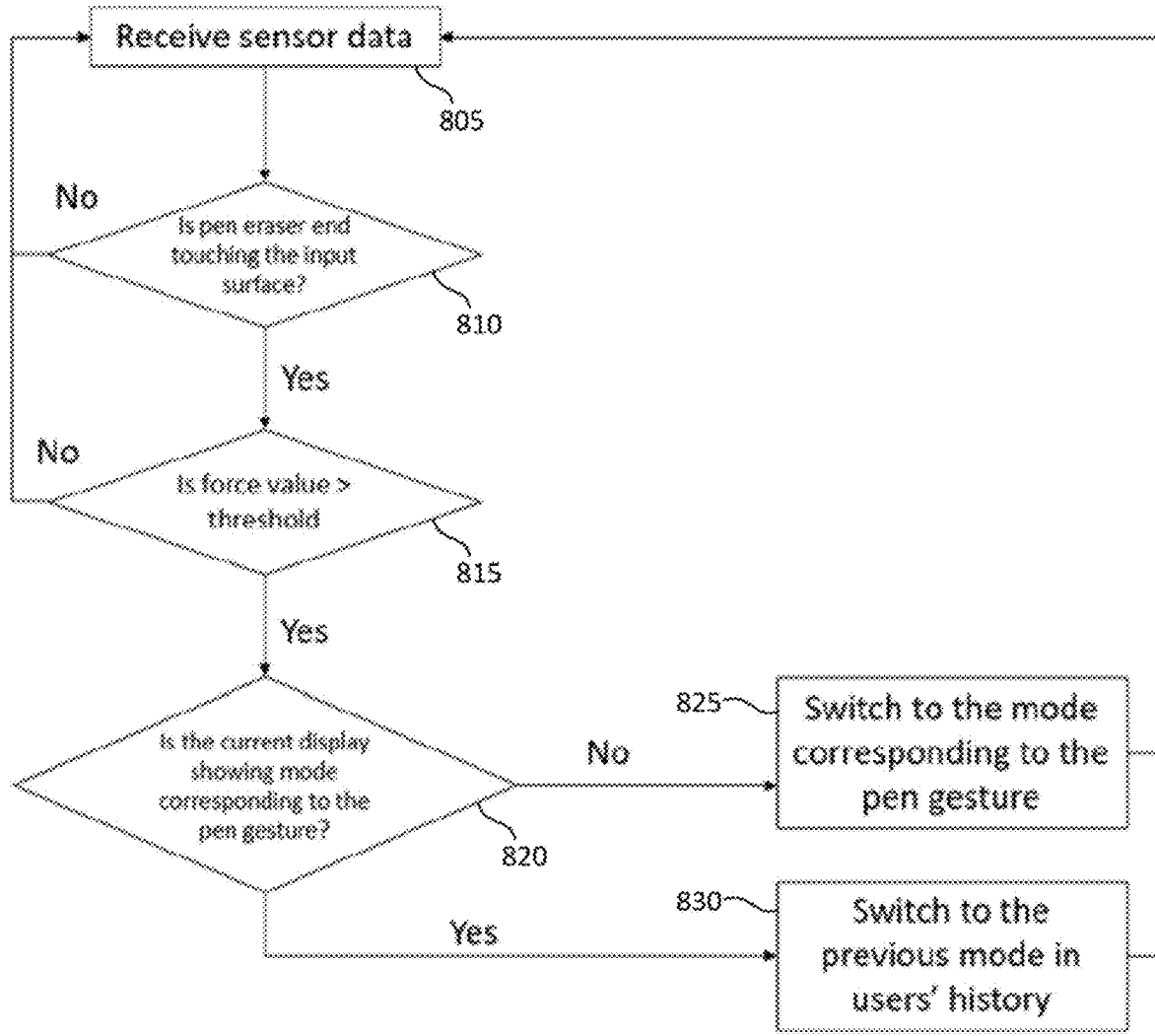
FIG. 8 is a flow diagram of a method of performing mode switching in response to a stylus eraser contacting a user interface, according to an embodiment of the disclosure.
Figure 9:
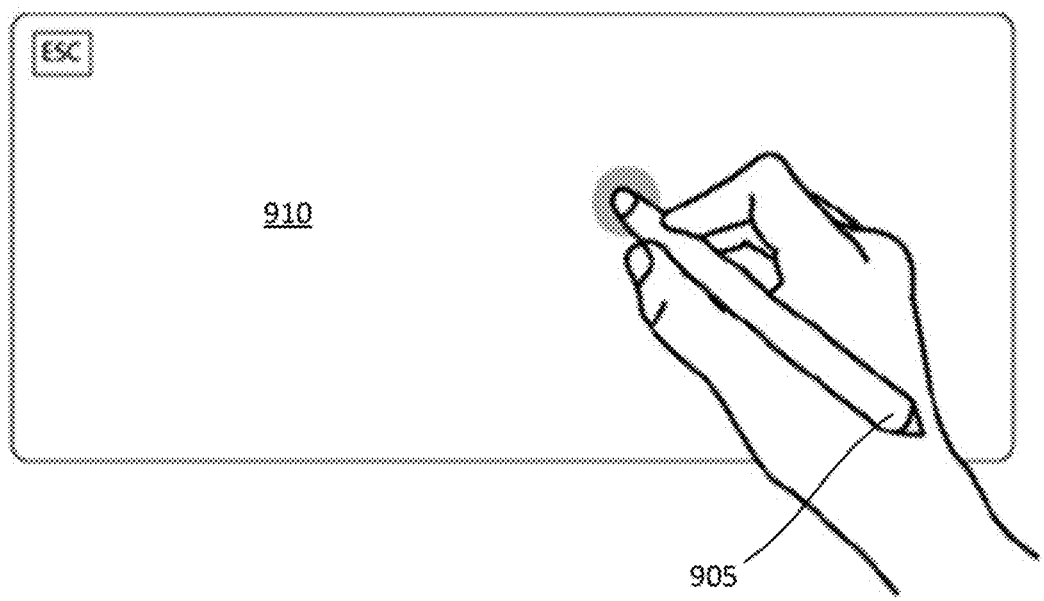
FIG. 9 shows a user input in the form of a stylus eraser contacting a user interface, according to an embodiment of the disclosure.

Turning to FIG. 8, there is shown a block diagram of a method of performing mode switching in which a user provides to touchscreen 104 a user input that corresponds to a stylus eraser touch operation (e.g. a stylus or other non-finger object contacting touchscreen 104). An example of a stylus eraser touch operation can be seen in FIG. 9. FIG. 9 shows a virtual keyboard 910 (with the majority of the keys removed for clarity) displayed by touchscreen 104. An eraser end of a user's stylus 905 is seen contacting and applying pressure to virtual keyboard 910. More generally, mode switching may be triggered by any portion of a stylus contacting touchscreen 104. For example, a pen tip of a stylus (an end of the stylus used for writing), a body of the stylus, or any other end of the stylus that is not used for writing may be used to trigger mode switching.

Returning to FIG. 8, at block 805, force sensor 118-2 generates a signal depending on the force with which the user input (i.e. the stylus eraser touch operation) is applied to touchscreen 104. For instance, force sensor 118-2 and touch sensor 118-2 may detect the size, shape, and the force of the area of touchscreen 104 that has been contacted. Furthermore, touch sensor 118-2 generates a signal depending on the type of user input (e.g. the "gesture type") that is applied to touchscreen 104. For example, touch sensor 118-2 may detect a signal emitted by stylus 905 using suitable electrical, optical, and/or mechanical components (such as a contact switch, a near field communication (NFC) module, a radio frequency identification (RFID) module, and/or the like), and accordingly on this basis touch sensor 118-2 may generate a signal that processor 101 may subsequently distinguish as relating to a stylus eraser touch operation as opposed to a finger/thumb touch operation.

At block 810, processor 101, communicating with force recognition submodule 116-2 of interpreter module 116, determines whether the force applied by the user input is greater than a stored force threshold. For example, processor 101 may calculate the average force applied to touchscreen 104 by the eraser end of stylus 905 in contact with touchscreen 104. The "average" force may be, for example, a mean, a mode, or a median of the force associated with stylus 905 contacting touchscreen 104 for the duration of time the eraser end stylus 905 is in contact with touchscreen 104. If the force applied by the user input is determined to not be greater than the stored force threshold, then it is determined that the user does not wish to effect mode switching. In such a case, the process may return to block 805, whereupon processor 101 waits for a subsequent user input to be provided to touchscreen 104.

If the force applied by the user input is determined to be greater than the stored force threshold, then at block 815, processor 101, communicating with touch recognition submodule 116-1 of interpreter module 116, determines whether the type of the user input corresponds to one or more stored gesture types. The stored gesture types may be stored within memory 103. If the type of the user input does not correspond to one or more of the stored gesture types, then it is determined by processor 101 that the user does not wish to effect mode switching. In such a case, the process may return to block 805, whereupon processor 101 waits for a subsequent user input to be provided to touchscreen 104.

If the type of the user input corresponds to one or more of the stored gesture types, then processor 101 may determine that mode switching is to proceed. In such a case, at block 820, processor 101 may determine whether the current display mode of touchscreen 104 corresponds to a display mode registered with the eraser end of stylus 905 contacting touchscreen 104. For example, portable computing device 100 may be configured, during a calibration phase, such that detection of the eraser end of stylus 905 contacting touchscreen 104 is to result in touchscreen 104 displaying virtual keyboard 910. Therefore, if processor 101 determines that touchscreen 104 is not currently displaying a virtual keyboard, then at block 825 processor 101 may cause touchscreen 104 to display a virtual keyboard.

If, on the other hand, processor 101 determines that touchscreen 104 is already displaying a virtual keyboard, then, at block 830, processor 101 may cause touchscreen 104 to transition to the most recent prior display mode in the user's mode-switching history. For example, if touchscreen 104 was previously displaying a virtual trackpad immediately prior to displaying virtual keyboard 910, then processor 101 may cause touchscreen 104 to cease display of virtual keyboard 910 and display instead the virtual trackpad. According to another example embodiment, if touchscreen 104 is currently displaying a virtual trackpad and if touchscreen 104 was previously displaying a virtual keyboard immediately prior to displaying the virtual trackpad, then processor 101 may cause touchscreen 104 to cease display of the virtual trackpad and display instead the virtual keyboard. The virtual keyboard or the virtual trackpad may be caused to appear on touchscreen 104 in a location generally corresponding to the location where the user input was detected on touchscreen 104.

By enabling mode switching in response to an eraser end or a body of a stylus contacting an area of touchscreen 104 with sufficient force, there may be no need for the user to first drop the stylus in order to trigger mode switching, which in turn may allow the user to switch modes with minimal interruption to the user's workflow.

FIGS. 10A to 15B show some examples of using gestures for mode switch on a computing device having two screens, according to various embodiments of this disclosure. The two screens may be rotatably or pivotably coupled together. Each of the two screens comprises a user interface (and more specifically, a graphic user interface or GUI).

In some embodiments, one screen (denoted "upper" screen hereinafter; which may be a touchscreen or a screen without touch-sensing functionality) is predefined as a display, and the other screen (denoted "lower" screen hereinafter; which is a touchscreen) is predefined as a display that may display a virtual keyboard for typing and/or a virtual trackpad for manipulating a computer cursor in a manner similar to a conventional computer mouse or trackpad (for example, moving the cursor, left click, right click, rolling a virtual computer mouse wheel, and/or the like). When using the virtual keyboard and/or virtual trackpad, the upper screen may be in a generally upright orientation with desired inclination mainly for displaying various information as needed, and the lower screen may be in a generally horizontal orientation for displaying information and, when mode switching is trigger, displaying a virtual keyboard and/or a virtual trackpad.

In some other embodiments, the two screens do not have predefined roles. Rather, the computing device comprises one or more orientation sensors (for example, one or more accelerometers) for determining the orientation of the computing device and automatically defining the roles of the two screens accordingly such that one screen is defined as the upper screen and the other screen is defined as the lower screen.

For ease of description, the upper screen in FIGS. 10A to 15B is identified using reference numeral 1033 and is partially shown therein. The touch-sensitive lower screen is denoted "lower touchscreen" and is identified using reference numeral 1032. The lower touchscreen 1032 is shown in full in FIGS. 10A to 15B.

In the example shown in FIG. 10A, the lower touchscreen 1032 is displaying no virtual keyboard or virtual trackpad (although it may display some information such as text, images, and/or video clips). In FIG. 10A, lower touchscreen 1032 detects a five-finger chord 1030 applied in an upper region of the lower touchscreen 1032. The five-finger chord 1030 may comprise a finger chord that is applied with sufficient force so as to trigger mode switching (as described above). Alternatively, lower touchscreen 1032 may detect the five-finger chord 1030 being applied to the lower touchscreen 1032 two or more times in rapid succession (such as a double-tap). In such a case, mode switching may be triggered irrespective of the force with which each instance of the finger chord 1030 is applied to the lower touchscreen 1032, or alternatively a minimum force may constitute an additional requirement for the mode switching to occur.

In response to mode switching, in FIG. 10B, the lower touchscreen 1032 is adjusted to display a virtual keyboard 1034 in an upper region thereof and a virtual trackpad 1036 in a lower region thereof. In FIG. 10C, lower touchscreen 1032 detects a five-finger chord 1042 applied to the lower touchscreen 1032 in the region of the virtual keyboard 1034 and dragged in a downward direction. In response, lower touchscreen 1032 relocates virtual keyboard 1034 to a lower portion of lower touchscreen 1032. In addition, lower touchscreen 1032 no longer displays the virtual trackpad 1036 is no longer displayed as if the virtual trackpad 1036 were moved out of the lower touchscreen 1032 from the bottom edge thereof, in order to enable virtual keyboard 1034 to be repositioned in the lower region of the lower touchscreen 1032 such that the upper region thereof may be used for displaying other information.

Alternatively, as shown in FIG. 10D, when the lower touchscreen 1032 is displaying no virtual keyboard or virtual trackpad, lower touchscreen 1032 may detect a five-finger chord 1038 applied in a lower region of lower touchscreen 1032. In response, at FIG. 10E, lower touchscreen 1032 displays virtual keyboard 1034 in the lower region thereof. In FIG. 10F (which may be mode-switched from FIG. 10C or FIG. 10E), lower touchscreen 1032 detects a further five-finger chord 1040 applied to virtual keyboard 1034 and removes virtual keyboard 1034 therefrom (FIG. 10G) such that the entire lower touchscreen 1032 may be used for information displaying.

At FIG. 10H, when the lower touchscreen 1032 is displaying virtual keyboard 1034 in a lower portion thereof, lower touchscreen 1032 detects a five-finger chord 1044 applied to the virtual keyboard 1034 and dragged in an upward direction. In response to this five-finger chord gesture, the lower touchscreen 1032 is adjusted to display virtual keyboard 1034 in an upper portion thereof and to display virtual trackpad 1036 in the lower region thereof (FIG. 10I).

The example shown in FIGS. 11A-11K is similar to that shown in FIGS. 10A-10I, and like features are numbered using like reference characters. However, in the example shown in FIGS. 11A-11K, either a fist bump 1130 or five-finger chords 1042 and 1044 may be used as gestures for triggering the mode switching in a manner similar to that shown in FIGS. 10A-10I.

More specifically, FIGS. 11A and 11B correspond to FIGS. 10A and 10B except that, as shown in FIG. 11A, a fist bump 1130 is used to trigger the mode switching of displaying the virtual keyboard 1034 and the virtual trackpad 1036.

Similar to the five-finger-chord gesture described above, the fist bump 1130 may be applied with sufficient force so as to trigger mode switching (as described above). In such a case, mode switching may be triggered irrespective of the force with which each instance of the fist bump 1130 is applied to the lower touchscreen 1032. Yet alternatively a minimum force applied by the fist bump 1130 may constitute an additional requirement for the mode switching to occur.

FIGS. 11C and 11D correspond to FIG. 10C and show that, either the five-finger chords 1042 (FIG. 11C) or the fist bump 1130 (FIG. 11D) with a downward drag motion may be used to trigger the mode switch (that is, relocating the virtual keyboard 1034 downward and removing the virtual trackpad 1036).

Similarly, FIGS. 11E to 11H are similar to FIGS. 10D to 10G except that the fist bump 1130 is used in FIGS. 11E to 11H to trigger the mode switch.

FIGS. 11I and 11J correspond to FIG. 10H and show that either the five-finger chords 1042 (FIG. 11C) or the fist bump 1130 (FIG. 11D) may be used to to trigger the mode switch. FIG. 11K corresponds to FIG. 10I.

Figure 12A:
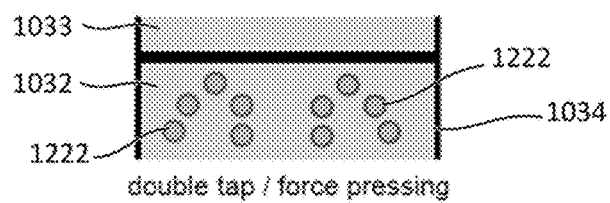
FIGS. 12A-12C show a flow diagram of different states of a user interface triggered in response to mode switching, according to an embodiment of the disclosure.
Figure 12B:
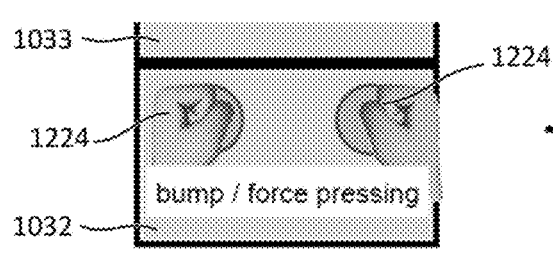
Figure 12C:
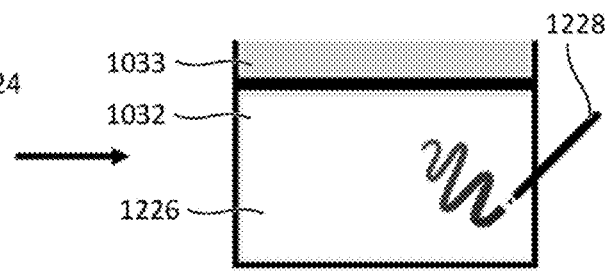

FIGS. 12A-12C show another example of mode switching according to embodiments of the disclosure. In this example, at FIGS. 12A and 12B, the lower touchscreen 1032 is displaying no virtual keyboard or virtual trackpad (although it may display some information such as text, images, and/or video clips). Mode switching may be triggered by lower touchscreen 1032 detecting two simultaneous five-finger chords 1222 or alternatively two simultaneous fist bumps 1224 being applied to the lower touchscreen 1032. In response to detecting such user input, the computing device may cause the lower touchscreen 1032 to display a drawing pad or drawing canvas 1226 configured for a drawing application (FIG. 12C) such that the user may use a stylus 1228 to draw thereon.

As shown in FIGS. 10A-10I and 11A-11K, when applying a gesture, the dragging direction may be used for determining the positions of the virtual keyboard 1034 and/or the virtual trackpad 1036 after mode switching. FIGS. 13A-13D show another example.

Figure 13A:
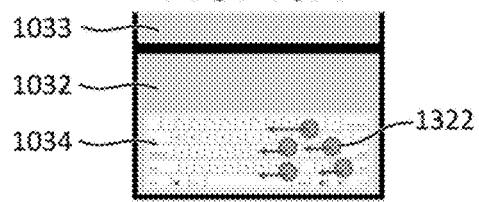
FIGS. 13A-13D show a flow diagram of different states of a user interface triggered in response to mode switching, according to an embodiment of the disclosure.
Figure 13B:
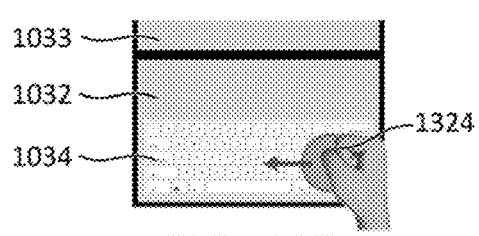
Figure 13C:
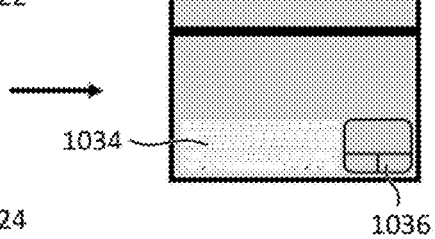
Figure 13D:
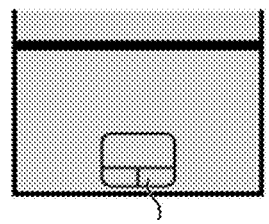

As shown in FIGS. 13A-13D, the lower touchscreen 1032 is initially displaying a virtual keyboard 1034 (FIG. 13A). Lower touchscreen 1032 may detect a five-finger chord 1322 or a fist bump 1324 being applied to the lower touchscreen 1032 in a region of the virtual keyboard 1034, and then being dragged in a leftward direction (FIGS. 13A and 13B). In response to detecting this gesture, lower touchscreen 1032 may shrink and/or relocate the virtual keyboard 1034 to a leftmost region of the lower touchscreen 1032 and may display a virtual trackpad 1036 on the right-hand side thereof (FIG. 13C). Depending on the distance over which the user input is moved across the lower touchscreen 1032, lower touchscreen 1032 may move the virtual keyboard 1034 out of the lower touchscreen 1032 from the left-hand side thereof, and the lower touchscreen 1032 may only display the virtual trackpad 1036 (FIG. 13D).

In some embodiments as shown in FIGS. 14A-14I, a user may use a stylus 1432, such as a non-writing end 1434 (which may be, for example, the eraser end) of stylus 1432, to trigger mode switching.

At FIG. 14A, the lower touchscreen 1032 is displaying no virtual keyboard or virtual trackpad (although it may display some information such as text, images, and/or video clips). Lower touchscreen 1032 may detect the non-writing end 1434 of the stylus 1432 being applied to the lower touchscreen 1032 with sufficient force so as to trigger mode switching (as described above). Alternatively, lower touchscreen 1032 may detect the non-writing end 1434 being applied to the lower touchscreen 1032 two or more times in rapid succession (such as a double-tap). In such a case, mode switching may be triggered irrespective of the force with which each instance of the end 1434 being applied to the lower touchscreen 1032 is detected by lower touchscreen 1032, or alternatively a minimum force may constitute an additional requirement for the mode switching to occur.

In response to mode switching, at FIG. 14B, the lower touchscreen 1032 displays a virtual keyboard 1034 in an upper region thereof and a virtual trackpad 1036 in a lower region thereof. At FIG. 14C, lower touchscreen 1032 detects a five-finger chord 1042 applied to the lower touchscreen 1032 in a region of virtual keyboard 1034 and dragged in a downward direction. In response, lower touchscreen 1032 relocates virtual keyboard 1034 to a lower portion thereof. In addition, lower touchscreen 1032 no longer displays virtual trackpad 1036, as if the virtual trackpad 1036 were moved out of the lower touchscreen 1032 from the bottom edge thereof, in order to enable virtual keyboard 1034 to be repositioned in the lower region of the lower touchscreen 1032 such that the upper region thereof may be used for displaying other information.

Alternatively, as shown in FIG. 14D, when the lower touchscreen 1032 is displaying no virtual keyboard or virtual trackpad, lower touchscreen 1032 may detect the non-writing end 1434 of the stylus 1432 being applied in a lower region thereof. In response, at FIG. 14E, the lower touchscreen 1032 may display virtual keyboard 1034 in the lower region thereof. At FIG. 14F (which may be mode-switched from FIG. 14C or FIG. 14E), lower touchscreen 1032 may detect the non-writing end 1434 of the stylus 1432 being applied to virtual keyboard 1034 and may remove virtual keyboard 1034 therefrom (FIG. 14G) such that the entire lower touchscreen 1032 may be used for information displaying.

At FIG. 14H, when the lower touchscreen 1032 is displaying virtual keyboard 1034 in a lower portion thereof, lower touchscreen 1032 may detect a five-finger chord 1044 being applied to the virtual keyboard 1034 and being dragged in an upward direction. In response to detecting this five-finger chord gesture, the lower touchscreen 1032 may display virtual keyboard 1034 in an upper portion thereof and display virtual trackpad 1036 in the lower region thereof (FIG. 14I).

FIGS. 15A and 15B show another example of mode switching according to embodiments of the disclosure. In this example, at FIG. 15A, the lower touchscreen 1032 is displaying no virtual keyboard or virtual trackpad (although it may display some information such as text, images, and/or video clips). Mode switching may be triggered by lower touchscreen 1032 detecting an end of a stylus 1524 (such as a non-writing end) being applied to the lower touchscreen 1032 for a sufficient period of time, or three or more successive times. In response to detecting such user input, the computing device may cause the lower touchscreen 1032 to display a drawing pad or drawing canvas 1226 configured for a drawing application (FIG. 15B) such that the user may use the stylus 1524 to draw thereon.

While FIGS. 10A to 15B have been described in the general context of using five-finger chords and fist bumps in order to trigger mode switching and/or in order to relocate certain elements on a touchscreen, variations to these embodiments may be made without departing from the scope of the disclosure. For example, it will be recognized by the skilled person that, instead of a five-finger chord, other types of finger chords, or indeed any other gesture as described herein, may be used to perform the functions shown in FIGS. 10A to 15B. Furthermore, the leftward and downward dragging directions that are shown are exemplary in nature, and any other suitable dragging direction may be used to relocate virtual objects on the touchscreen.

In the examples shown in FIGS. 10A to 15B, mode switching occurs on the lower touchscreen in response to one or more gestures applied thereto. In some embodiments, the upper screen may be a touchscreen, and mode switching may occur on the upper screen in response to one or more gestures applied thereto.

In some embodiments, the lower screen may be a touchscreen, and mode switching may occur on one or both of the upper and lower screens in response to one or more gestures applied to the lower touchscreen.

In some embodiments, the upper screen may be a touchscreen, and mode switching may occur on one or both of the upper and lower screens in response to one or more gestures applied to the upper touchscreen.

In some embodiments, both upper and lower screens may be touchscreens, and mode switching may occur on one or both of the upper and lower screens in response to one or more gestures applied to both upper and lower screens.

While the disclosed embodiments have been presented in the primary context of mode switching in which a computing device's touchscreen transitions from displaying a first interactive feature (such as a virtual keyboard) to a second, different interactive feature (such as a virtual trackpad), and vice versa, the present disclosure extends to other suitable types of mode switching. For example, instead of switching between different displays on a computing device's touchscreen, mode switching may extend to any other suitable function, such as changing a volume of audio output by the computing device, or alternately displaying/hiding a video progress bar.

In addition, while embodiments of the disclosure are directed at determining whether mode switching is to be performed based on a force associated with a user input, and a type of the user input that is detected (such as a finger chord, finger swipe, or stylus eraser touch operation), the disclosure is not limited to such a combination of features. For example, according to some embodiments, the disclosure extends to determining whether mode switching is to be performed based solely on whether a specific type of user input is received at the touchscreen, irrespective of the force associated with the user input.

According to further embodiments of the disclosure, mode switching may be triggered based, for example, on user inputs defined according to one or more fingers contacting the display simultaneously with an end of a stylus (such as the eraser end) also contacting the display. Such a type of user input may also constitute a finger chord as described herein. Further types of user inputs that may trigger mode switching may comprise, for example, the sequential contacting of the display with multiple ones of the user's fingers. For example, mode switching may be triggered in response to a user's index, middle, ring, and little finger contacting the display, not necessarily in that order. Still further, mode switching may be triggered based on a direction of a finger swipe applied to the display, or based on a specific area of the display at which the user input is detected.

According to some embodiments, mode switching may be based on a direction of sliding or swiping with which a user input is provided to the touchscreen (such as the lower touchscreen of a dual-screen computing device). For example, mode switching may be triggered depending on whether a finger swipe is oriented in one or more predefined directions, such as a leftward swipe or a rightward swipe.

According to some embodiments, a gesture type may be determined based not only on physical contact between the user's hand/fingers/stylus or the like, but also on the basis of a proximity to the touchscreen of the user's hand/fingers/stylus or the like. For example, by hovering a user's fingertip within close proximity to a touchscreen using suitable proximity/touch detection technologies such as proximity/touch detection technologies using surface acoustic wave (SAW), the computing device may determine that the fingertip's relative position to the touchscreen is to be included as part of the overall gesture or user input that is applied to touchscreen. For example, a user wishing to trigger mode switching based on a five-finger chord being applied to the touchscreen may physically contact the touchscreen with only four fingers while the fifth finger hovers in close proximity to the touchscreen. The computing device (which is configured for proximity sensing) then, in addition to detecting the four fingers physically contacting the touchscreen, may additionally detect the position of the fifth finger in close proximity to the touchscreen. The computing device may therefore determine that a five-finger chord has been applied to the touchscreen.

According to some embodiments, proximity sensing may be incorporated with force detection. For example, while a user's hand/fingers/stylus or the like that hovers in close proximity to the touchscreen does not apply any force to the touchscreen, the computing device may nevertheless determine that a sufficiently high average force has been provided to the touchscreen by other objects in order to trigger mode switching. Continuing from the above example, assume that the force required to trigger mode switching is at least 5f, wherein f is a force applied by each of five fingers. If only four of the fingers physically contact the touchscreen, and the fifth finger hovers in close proximity to the touchscreen, then mode switching may still be triggered if, for example, one of the four fingers contacting the touchscreen applies a force to the touchscreen that is at least 2f.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A method performed by a computing device having a first touch-sensitive user interface and a second touch-sensitive user interface, the method comprising:
    detecting a user input applied to a selected one of the first and second user interfaces, wherein the selected user interface is currently displaying a virtual trackpad;
    determining a force of the user input;
    determining a type of the user input; and
    performing a function, by the computing device, based on the force, the type of the user input, and a detection of the user input applied to the selected user interface,
    wherein performing the function comprises:
        determining that the force has increased above a preset threshold; and
        based on determining that the force has increased above the preset threshold:
            the display of the virtual trackpad to disappear; and
            causing a virtual keyboard to be displayed.

2. The method of claim 1, wherein said performing the function comprises:
    causing the virtual keyboard to be displayed in an area of the selected user interface to which the user input is applied, wherein the area corresponds to a location on the selected user interface at which the user input is applied.

3. The method of claim 1, wherein said performing the function comprises:
    comparing the force to the preset force threshold.

4. The method of claim 1, wherein:
    said detecting the user input comprises detecting a plurality of locations on the selected one of the first and second user interfaces at which the user input is applied; and
    determining the force of the user input comprises:
        determining a plurality of forces with which the user input is applied at the plurality of locations; and
        determining an average force based on the plurality of forces.

5. The method of claim 1, wherein:
said detecting the user input comprises detecting a duration over which the user input is applied to the selected user interface; and
said determining the force comprises determining an average force with which the user input is applied to the selected user interface over the duration.

6. The method of claim 1, wherein said determining the type of the user input comprises:
determining a geometry pattern of the user input on the selected one of the first and second user interfaces at which the user input is applied; and
comparing the geometry pattern to one or more gesture types, each gesture type being associated with a corresponding pattern.

7. The method of claim 6, wherein the one or more gesture types are associated with one or more of:
a pattern corresponding to a finger chord;
a pattern corresponding to a finger swipe;
a pattern corresponding to a fist;
a pattern corresponding to an open palm;
a pattern corresponding to an end of a non-finger object contacting the selected user interface; and
a pattern corresponding to a body of a stylus contacting the selected user interface.

8. The method of claim 1, further comprising:
determining a region on the selected user interface at which the user input is applied; and
wherein said performing the function by the computing device is further based on the determined region.

9. A non-transitory computer-readable storage media comprising computer-executable instructions, wherein the instructions, when executed, cause a processor to perform:
detecting a user input applied to a selected one of a first and a second touch-sensitive user interface, wherein the selected user interface is currently displaying a virtual trackpad;
determining a force of the user input;
determining a type of the user input; and
performing a function by the computing device based on the force, the type of the user input, and a determination that the user input is applied to the selected user interface,
wherein performing the function comprises:
determining that the force has increased above a preset threshold; and
based on determining that the force has increased above the preset threshold:
causing the display of the virtual trackpad to disappear; and
causing a virtual keyboard to be displayed.

10. A computing device comprising:
a first and a second touch-sensitive user interfaces;
one or more computer-readable storage media; and
one or more processors communicative with the one or more computer-readable storage media and the first and second touch-sensitive user interfaces for:
detecting a user input applied to a selected one of the first and second user interfaces, wherein the selected user interface is currently displaying a virtual trackpad;
determining a force of the user input;
determining a type of the user input; and
performing a function by the computing device based on the force, the type of the user input, and a determination that the user input is applied to the selected user interface,
wherein performing the function comprises:
determining that the force has increased above a preset threshold; and
based on determining that the force has increased above the preset threshold:
causing the display of the virtual trackpad to disappear; and
causing a virtual keyboard to be displayed.

11. The computing device of claim 10, wherein said performing the function comprises:
causing the virtual keyboard to be displayed in an area of the selected user interface to which the user input is applied, wherein the area corresponds to a location on the selected user interface at which the user input is applied.

12. The computing device of claim 10, wherein the first user interface is rotatable relative to the second user interface.

13. The computing device of claim 10, wherein said performing the function comprises:
comparing the force to the preset force threshold.

14. The computing device of claim 10, wherein:
said detecting the user input comprises detecting a plurality of locations on the selected one of the first and second user interfaces at which the user input is applied; and
determining the force of the user input comprises:
determining a plurality of forces with which the user input is applied at the plurality of locations; and
determining an average force based on the plurality of forces.

15. The computing device of claim 10, wherein:
said detecting the user input comprises detecting a duration over which the user input is applied to the selected user interface; and
said determining the force comprises determining an average force with which the user input is applied to the first user interface over the duration.

16. The computing device of claim 10, wherein said determining the type of the user input comprises:
determining a geometry pattern of the user input on the selected one of the first and second user interfaces at which the user input is applied; and
comparing the geometry pattern to one or more gesture types, each gesture type being associated with a corresponding pattern.

17. The computing device of claim 16, wherein the one or more gesture types are associated with one or more of:
a pattern corresponding to a finger chord;
a pattern corresponding to a finger swipe;
a pattern corresponding to a fist;
a pattern corresponding to an open palm;
a pattern corresponding to an end of a non-finger object contacting the selected user interface; and
a pattern corresponding to a body of a stylus contacting the selected user interface.

18. The computing device of claim 10, wherein the method further comprises:
determining a region on the selected user interface at which the user input is applied; and
wherein said determining whether to perform the function by the computing device is further based on the determined region.

* * * * *